(12) United States Patent
O'Connor et al.

(10) Patent No.: US 11,475,033 B2
(45) Date of Patent: *Oct. 18, 2022

(54) USER INTERFACE DATA SAMPLE TRANSFORMER

(71) Applicant: Palantir Technologies Inc., Palo Alto, CA (US)

(72) Inventors: Gregory O'Connor, San Francisco, CA (US); Samuel Fendell, Palo Alto, CA (US); Ethan Breder, Menlo Park, CA (US); William Rhyne, Arlington, VA (US); Michael Kodiak, San Francisco, CA (US); Thomas Haynes, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/203,302

(22) Filed: Mar. 16, 2021

(65) Prior Publication Data

US 2021/0209123 A1 Jul. 8, 2021

Related U.S. Application Data

(63) Continuation of application No. 15/675,173, filed on Aug. 11, 2017, now Pat. No. 10,977,267.
(Continued)

(51) Int. Cl.
*G06F 16/25* (2019.01)
*G06F 3/048* (2013.01)
*G06F 21/56* (2013.01)

(52) U.S. Cl.
CPC ............ *G06F 16/254* (2019.01); *G06F 3/048* (2013.01); *G06F 16/252* (2019.01); *G06F 21/565* (2013.01)

(58) Field of Classification Search
CPC .................................................... G06F 16/254
See application file for complete search history.

(56) References Cited

U.S. PATENT DOCUMENTS

| 5,418,950 A | 5/1995 | Li et al. |
| 5,428,737 A | 6/1995 | Li et al. |

(Continued)

FOREIGN PATENT DOCUMENTS

| DE | 102014103482 A1 | 9/2014 |
| EP | 1647908 A2 | 4/2006 |

(Continued)

OTHER PUBLICATIONS

"A Quick Guide to UniProtKB Swiss-Prot & TrEMBL", UniProt Consortium, Ongoing and future developments at the Universal Protein Resource, (Sep. 2011), 1-2.

(Continued)

*Primary Examiner* — Van H Oberly
(74) *Attorney, Agent, or Firm* — Schwegman Lundberg & Woessner, P.A.

(57) ABSTRACT

An approach for transforming a large dataset using user interface-based transformations applied to a sample of the dataset is disclosed. The sample of the large dataset has the same or similar format as the large dataset. A user can quickly apply transformations to the sample dataset using UI-based instructions. The UI-based instructions can be used to create a transformation job that can be configured to run on a backed database, such as a distributed database, to apply the transformations to the large dataset.

20 Claims, 12 Drawing Sheets

Related U.S. Application Data

(60) Provisional application No. 62/495,587, filed on Aug. 17, 2016.

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,608,899 A | 3/1997 | Li et al. | |
| 5,613,105 A | 3/1997 | Zbikowski et al. | |
| 5,701,456 A | 12/1997 | Jacopi et al. | |
| 5,724,575 A | 3/1998 | Hoover et al. | |
| 5,794,228 A | 8/1998 | French et al. | |
| 5,794,229 A | 8/1998 | French et al. | |
| 5,857,329 A | 1/1999 | Bigham | |
| 5,911,138 A | 6/1999 | Li et al. | |
| 5,918,225 A | 6/1999 | White et al. | |
| 6,208,985 B1 | 3/2001 | Krehel | |
| 6,236,994 B1 | 5/2001 | Swartz et al. | |
| 6,279,015 B1 | 8/2001 | Fong et al. | |
| 6,289,334 B1 | 9/2001 | Reiner et al. | |
| 6,311,181 B1 | 10/2001 | Lee et al. | |
| 6,321,274 B1 | 11/2001 | Shakib et al. | |
| 6,604,100 B1 | 8/2003 | Fernandez et al. | |
| 6,643,613 B2 | 11/2003 | McGee et al. | |
| 6,701,352 B1 | 3/2004 | Gardner et al. | |
| 6,718,336 B1 | 4/2004 | Saffer et al. | |
| 6,745,382 B1 | 6/2004 | Zothner | |
| 6,851,108 B1 | 2/2005 | Syme et al. | |
| 6,857,120 B1 | 2/2005 | Arnold et al. | |
| 6,877,137 B1 | 4/2005 | Rivette et al. | |
| 6,968,329 B1 | 11/2005 | Chung et al. | |
| 6,976,024 B1 | 12/2005 | Chavez, Jr. et al. | |
| 7,028,223 B1 | 4/2006 | Kolawa et al. | |
| 7,085,890 B2 | 8/2006 | Kashyap | |
| 7,155,728 B1 | 12/2006 | Prabhu et al. | |
| 7,216,133 B2 | 5/2007 | Wu et al. | |
| 7,406,592 B1 | 7/2008 | Polyudov | |
| 7,519,589 B2 | 4/2009 | Charnock et al. | |
| 7,546,353 B2 | 6/2009 | Hesselink et al. | |
| 7,610,290 B2 | 10/2009 | Kruy et al. | |
| 7,627,489 B2 | 12/2009 | Schaeffer et al. | |
| 7,668,963 B1 | 2/2010 | Miner et al. | |
| 7,707,230 B1 | 4/2010 | Brenner | |
| 7,783,679 B2 | 8/2010 | Bley | |
| 7,853,573 B2 | 12/2010 | Warner et al. | |
| 7,877,421 B2 | 1/2011 | Berger et al. | |
| 7,908,521 B2 | 3/2011 | Sridharan et al. | |
| 7,979,424 B2 | 7/2011 | Dettinger | |
| 8,073,857 B2 | 12/2011 | Sreekanth | |
| 8,103,962 B2 | 1/2012 | Embley et al. | |
| 8,417,715 B1 | 4/2013 | Bruckhaus | |
| 8,429,194 B2 | 4/2013 | Aymeloglu et al. | |
| 8,433,702 B1 | 4/2013 | Carrino et al. | |
| 8,499,287 B2 | 7/2013 | Shafi et al. | |
| 2,634,745 A1 | 9/2013 | Sampson | |
| 8,560,494 B1 | 10/2013 | Downing et al. | |
| 8,639,552 B1 | 1/2014 | Chen et al. | |
| 8,788,935 B1 | 7/2014 | Hirsch et al. | |
| 8,799,867 B1 | 8/2014 | Peri-Glass et al. | |
| 8,909,597 B2 | 12/2014 | Aymeloglu et al. | |
| 8,924,429 B1 | 12/2014 | Fisher et al. | |
| 8,935,201 B1 | 1/2015 | Fisher et al. | |
| 9,031,981 B1 | 5/2015 | Potter et al. | |
| 9,105,000 B1 | 8/2015 | White et al. | |
| 9,122,532 B2 * | 9/2015 | Kosuru | G06F 9/5066 |
| 9,292,388 B2 | 3/2016 | Fisher et al. | |
| 9,514,205 B1 | 12/2016 | Yazicioglu | |
| 9,946,776 B1 | 4/2018 | Yazicioglu et al. | |
| 10,977,267 B1 | 4/2021 | O'Connor et al. | |
| 2002/0087744 A1 | 7/2002 | Kitchin | |
| 2002/0124005 A1 | 9/2002 | Matson et al. | |
| 2002/0184111 A1 | 12/2002 | Swanson | |
| 2003/0004770 A1 | 1/2003 | Miller et al. | |
| 2003/0023620 A1 | 1/2003 | Trotta | |
| 2003/0105833 A1 | 6/2003 | Daniels et al. | |
| 2003/0110297 A1 | 6/2003 | Tabatabai et al. | |
| 2003/0120665 A1 | 6/2003 | Fox | |
| 2004/0088177 A1 | 5/2004 | Travis et al. | |
| 2004/0098731 A1 | 5/2004 | Demsey et al. | |
| 2004/0103088 A1 | 5/2004 | Cragun et al. | |
| 2004/0117386 A1 | 6/2004 | Lavender et al. | |
| 2004/0126840 A1 | 7/2004 | Cheng et al. | |
| 2004/0132592 A1 | 7/2004 | Yu | |
| 2004/0139212 A1 | 7/2004 | Mukherjee | |
| 2004/0153837 A1 | 8/2004 | Preston et al. | |
| 2004/0172592 A1 | 9/2004 | Collie et al. | |
| 2004/0193608 A1 | 9/2004 | Gollapudi et al. | |
| 2004/0236796 A1 | 11/2004 | Bhatt et al. | |
| 2005/0004911 A1 | 1/2005 | Goldberg et al. | |
| 2005/0021397 A1 | 1/2005 | Cui et al. | |
| 2005/0022111 A1 | 1/2005 | Collet et al. | |
| 2005/0086256 A1 * | 4/2005 | Owens | G06F 16/284 |
| 2005/0120080 A1 | 6/2005 | Weinreb et al. | |
| 2005/0183005 A1 | 8/2005 | Denoue et al. | |
| 2005/0223413 A1 | 10/2005 | Duggan et al. | |
| 2005/0226473 A1 | 10/2005 | Ramesh | |
| 2005/0257125 A1 | 11/2005 | Roesner et al. | |
| 2005/0278286 A1 | 12/2005 | Djugash et al. | |
| 2006/0004740 A1 | 1/2006 | Dettinger et al. | |
| 2006/0047717 A1 | 3/2006 | Pereira | |
| 2006/0070046 A1 | 3/2006 | Balakrishnan et al. | |
| 2006/0074967 A1 | 4/2006 | Shaburov | |
| 2006/0080616 A1 | 4/2006 | Vogel et al. | |
| 2006/0116991 A1 | 6/2006 | Calderwood | |
| 2006/0129992 A1 | 6/2006 | Oberholtzer et al. | |
| 2006/0142949 A1 | 6/2006 | Helt | |
| 2006/0167909 A1 | 7/2006 | Mendis et al. | |
| 2006/0209085 A1 | 9/2006 | Wong et al. | |
| 2006/0236307 A1 | 10/2006 | Debruin et al. | |
| 2006/0271884 A1 | 11/2006 | Hurst | |
| 2006/0288046 A1 | 12/2006 | Gupta | |
| 2007/0005582 A1 | 1/2007 | Navratil et al. | |
| 2007/0005635 A1 | 1/2007 | Martinez et al. | |
| 2007/0027851 A1 | 2/2007 | Kruy et al. | |
| 2007/0094248 A1 | 4/2007 | McVeigh et al. | |
| 2007/0113164 A1 | 5/2007 | Hansen et al. | |
| 2007/0150805 A1 | 6/2007 | Misovski | |
| 2007/0168336 A1 | 7/2007 | Ransil et al. | |
| 2007/0178501 A1 | 8/2007 | Rabinowitz et al. | |
| 2007/0192281 A1 | 8/2007 | Cradick et al. | |
| 2007/0239762 A1 | 10/2007 | Farahbod | |
| 2007/0260582 A1 | 11/2007 | Liang | |
| 2008/0114797 A1 | 5/2008 | Jones et al. | |
| 2008/0114997 A1 | 5/2008 | Chin | |
| 2008/0126344 A1 | 5/2008 | Hoffman et al. | |
| 2008/0126402 A1 | 5/2008 | Sikchi et al. | |
| 2008/0126951 A1 | 5/2008 | Sood et al. | |
| 2008/0155440 A1 | 6/2008 | Trevor et al. | |
| 2008/0196016 A1 | 8/2008 | Todd | |
| 2008/0201313 A1 | 8/2008 | Dettinger et al. | |
| 2008/0215543 A1 | 9/2008 | Huang et al. | |
| 2008/0267386 A1 | 10/2008 | Cooper | |
| 2008/0270950 A1 | 10/2008 | Whitehead et al. | |
| 2008/0306981 A1 | 12/2008 | Jiang et al. | |
| 2009/0000661 A1 | 1/2009 | Venable | |
| 2009/0006150 A1 | 1/2009 | Prigge et al. | |
| 2009/0007056 A1 | 1/2009 | Prigge et al. | |
| 2009/0024639 A1 | 1/2009 | Steinmann | |
| 2009/0043762 A1 | 2/2009 | Shiverick et al. | |
| 2009/0055487 A1 | 2/2009 | Moraes et al. | |
| 2009/0083275 A1 | 3/2009 | Jacob et al. | |
| 2009/0094217 A1 | 4/2009 | Dettinger et al. | |
| 2009/0144747 A1 | 6/2009 | Baker | |
| 2009/0161147 A1 | 6/2009 | Klave | |
| 2009/0172674 A1 | 7/2009 | Bobak et al. | |
| 2009/0187556 A1 | 7/2009 | Ross et al. | |
| 2009/0193012 A1 | 7/2009 | Williams | |
| 2009/0199047 A1 | 8/2009 | Vaithesswaran et al. | |
| 2009/0248721 A1 | 10/2009 | Burton et al. | |
| 2009/0282068 A1 | 11/2009 | Shockro et al. | |
| 2009/0299830 A1 | 12/2009 | West et al. | |
| 2009/0300482 A1 | 12/2009 | Summers et al. | |
| 2010/0011282 A1 | 1/2010 | Dollard et al. | |
| 2010/0049729 A1 | 2/2010 | Black | |

(56) References Cited

U.S. PATENT DOCUMENTS

| | | |
|---|---|---|
| 2010/0073315 A1 | 3/2010 | Lee et al. |
| 2010/0082671 A1 | 4/2010 | Li et al. |
| 2010/0145902 A1 | 6/2010 | Boyan et al. |
| 2010/0161646 A1 | 6/2010 | Ceballos et al. |
| 2010/0169376 A1 | 7/2010 | Chu |
| 2010/0169405 A1 | 7/2010 | Zhang |
| 2010/0199167 A1 | 8/2010 | Uematsu et al. |
| 2010/0313119 A1 | 12/2010 | Baldwin et al. |
| 2011/0035396 A1 | 2/2011 | Merz et al. |
| 2011/0035667 A1 | 2/2011 | Dittmer-Roche |
| 2011/0041084 A1 | 2/2011 | Karam |
| 2011/0066497 A1 | 3/2011 | Gopinath et al. |
| 2011/0074811 A1 | 3/2011 | Hanson et al. |
| 2011/0093490 A1 | 4/2011 | Schindlauer et al. |
| 2011/0119583 A1 | 5/2011 | Gilley et al. |
| 2011/0131547 A1 | 6/2011 | Elaasar |
| 2011/0145401 A1 | 6/2011 | Westlake |
| 2011/0208822 A1 | 8/2011 | Rathod |
| 2011/0252282 A1 | 10/2011 | Meek et al. |
| 2011/0258216 A1 | 10/2011 | Supakkul |
| 2011/0261049 A1* | 10/2011 | Cardno .......... G06Q 40/04 345/419 |
| 2011/0270871 A1 | 11/2011 | He et al. |
| 2011/0313982 A1 | 12/2011 | Kranendonk et al. |
| 2011/0321008 A1 | 12/2011 | Jhoney et al. |
| 2012/0078595 A1 | 3/2012 | Balandin et al. |
| 2012/0102022 A1 | 4/2012 | Miranker et al. |
| 2012/0159449 A1 | 6/2012 | Arnold et al. |
| 2012/0173381 A1 | 7/2012 | Smith |
| 2012/0174057 A1 | 7/2012 | Narendra et al. |
| 2012/0188252 A1 | 7/2012 | Law |
| 2012/0284719 A1 | 11/2012 | Phan et al. |
| 2013/0024268 A1 | 1/2013 | Manickavelu |
| 2013/0024731 A1 | 1/2013 | Shochat et al. |
| 2013/0054551 A1 | 2/2013 | Lange |
| 2013/0086482 A1 | 4/2013 | Parsons |
| 2013/0096968 A1 | 4/2013 | Van Pelt et al. |
| 2013/0117008 A1 | 5/2013 | Condie et al. |
| 2013/0198624 A1 | 8/2013 | Aymeloglu et al. |
| 2013/0225212 A1 | 8/2013 | Khan |
| 2013/0226944 A1 | 8/2013 | Baid et al. |
| 2013/0232220 A1 | 9/2013 | Sampson |
| 2013/0262061 A1 | 10/2013 | Laake |
| 2013/0275383 A1 | 10/2013 | Mclarty |
| 2014/0006216 A1 | 1/2014 | Malapati et al. |
| 2014/0012886 A1 | 1/2014 | Downing et al. |
| 2014/0074888 A1 | 3/2014 | Potter et al. |
| 2014/0011561 A1 | 4/2014 | Marinelli, III et al. |
| 2014/0108074 A1 | 4/2014 | Miller et al. |
| 2014/0115589 A1 | 4/2014 | Marinelli, III et al. |
| 2014/0145711 A1 | 5/2014 | Burdette et al. |
| 2014/0195891 A1 | 7/2014 | Venkata Radha Krishna Rao et al. |
| 2014/0214579 A1 | 7/2014 | Shen et al. |
| 2014/0244388 A1 | 8/2014 | Manouchehri et al. |
| 2014/0279934 A1* | 9/2014 | Li ................... G06F 16/215 707/687 |
| 2015/0106685 A1 | 4/2015 | Gupta |
| 2015/0112641 A1 | 4/2015 | Faraj |
| 2015/0269030 A1 | 9/2015 | Fisher et al. |
| 2016/0026923 A1 | 1/2016 | Erenrich et al. |
| 2016/0085764 A1 | 3/2016 | Sarkar et al. |
| 2016/0092476 A1 | 3/2016 | Stojanovic et al. |
| 2016/0132495 A1 | 5/2016 | Ghatage et al. |
| 2016/0133035 A1* | 5/2016 | Krajec ............. G06T 11/206 345/440 |
| 2016/0161621 A1 | 6/2016 | Salama et al. |
| 2018/0210935 A1 | 7/2018 | Yazicioglu et al. |

FOREIGN PATENT DOCUMENTS

| | | |
|---|---|---|
| EP | 2634745 A1 | 9/2013 |
| EP | 2743839 A1 | 6/2014 |
| EP | 2778986 A1 | 9/2014 |
| EP | 2921975 A1 | 9/2015 |
| EP | 3185144 A1 | 6/2017 |
| GB | 2366498 A | 3/2002 |
| GB | 2508503 B | 1/2015 |
| GB | 2508293 B | 4/2015 |
| HK | 1194178 B | 9/2015 |
| NZ | 622485 A | 3/2015 |
| NZ | 616212 A | 5/2015 |
| NZ | 616299 A | 7/2015 |
| WO | WO-0034895 A1 | 6/2000 |
| WO | WO-2010030917 A2 | 3/2010 |
| WO | WO-201 3030595 A1 | 3/2013 |
| WO | WO-2015100541 A1 | 7/2015 |
| WO | WO-201 6049460 A1 | 3/2016 |
| WO | WO-2016064771 A1 | 4/2016 |

OTHER PUBLICATIONS

"A Tour of Pinboard", [Online] Retrieved from the Internet: <URL: https://pinboard.in/tour/>, (May 15, 2014), 1-6.

"U.S. Appl. No. 13/411,291, Examiner Interview Summary dated Oct. 1, 2015", 3 pgs.

"U.S. Appl. No. 13/411,291, Non Final Office Action dated Jul. 15, 2015", 39 pgs.

"U.S. Appl. No. 13/411,291, Notice of Allowance dated Apr. 22, 2016", 27 pgs.

"U.S. Appl. No. 13/608,864, Final Office Action dated Jun. 8, 2015", 23 pgs.

"U.S. Appl. No. 13/608,864, First Action Interview Pre-Interview Communication dated Mar. 17, 2015", 4 pgs.

"U.S. Appl. No. 13/657,635, Final Office Action dated Oct. 7, 2015", 43 pgs.

"U.S. Appl. No. 13/657,635, Non Final Office Action dated Mar. 30, 2015", 20 pgs.

"U.S. Appl. No. 13/657,635, Notice of Allowance dated Jan. 29, 2016", 10 pgs.

"U.S. Appl. No. 13/657,656, Final Office Action dated May 6, 2015", 29 pgs.

"U.S. Appl. No. 13/657,656, Non Final Office Action dated Oct. 7, 2014", 16 pgs.

"U.S. Appl. No. 13/767,779, Notice of Allowance dated Mar. 17, 2015", 28 pgs.

"U.S. Appl. No. 13/827,627, Examiner Interview Summary dated Oct. 20, 2015", 3 pgs.

"U.S. Appl. No. 13/827,627, Final Office Action dated Aug. 26, 2015", 21 pgs.

"U.S. Appl. No. 13/827,627, Non Final Office Action dated Mar. 2, 2015", 22 pgs.

"U.S. Appl. No. 13/827,627, Non Final Office Action dated Dec. 22, 2015", 12 pgs.

"U.S. Appl. No. 13/831,791, Final Office Action dated Aug. 6, 2015", 19 pgs.

"U.S. Appl. No. 13/831,791, Non Final Office Action dated Mar. 4, 2015", 20 pgs.

"U.S. Appl. No. 14/019,534, Examiner Interview Summary dated Sep. 4, 2015", 5 pgs.

"U.S. Appl. No. 14/019,534, First Action Interview Pre-Interview Communication dated Jul. 20, 2015", 4 pgs.

"U.S. Appl. No. 14/019,534, Notice of Allowance dated Feb. 4, 2016", 20 pgs.

"U.S. Appl. No. 14/025,653, First Action Interview Pre-Interview Communication dated Mar. 3, 2016", 9 pgs.

"U.S. Appl. No. 14/025,653, First Action Interview Pre-Interview Communication dated Oct. 6, 2015", 13 pgs.

"U.S. Appl. No. 14/134,558, Non Final Office Action dated Oct. 7, 2015", 9 pgs.

"U.S. Appl. No. 14/254,757, Notice of Allowance dated Sep. 10, 2014", 30 pgs.

"U.S. Appl. No. 14/254,773, Notice of Allowance dated Aug. 20, 2014", 23 pgs.

"U.S. Appl. No. 14/304,741, Final Office Action dated Mar. 3, 2015", 24 pgs.

(56) References Cited

OTHER PUBLICATIONS

"U.S. Appl. No. 14/304,741, Notice of Allowance dated Apr. 7, 2015", 22 pgs.
"U.S. Appl. No. 14/304,741, Pre-Interview Communication dated Aug. 6, 2014", 13 pgs.
"U.S. Appl. No. 14/562,524, Final Office Action dated Feb. 18, 2016", 20 pgs.
"U.S. Appl. No. 14/581,902, Notice of Allowance dated Nov. 13, 2015", 16 pgs.
"U.S. Appl. No. 14/877,229, Non Final Office Action dated Mar. 22, 2016", 46 pgs.
"U.S. Appl. No. 15/092,814, Notice of Allowance dated Aug. 25, 2016", 11 pgs.
"U.S. Appl. No. 15/292,075, Non Final Office Action dated Aug. 7, 2017", 6 pgs.
"U.S. Appl. No. 15/292,075, Notice of Allowance dated Dec. 5, 2017", 10 pgs.
"U.S. Appl. No. 15/292,078, Final Office Action dated Nov. 8, 2017", 15 pgs.
"U.S. Appl. No. 15/292,078, Non Final Office Action dated Apr. 27, 2018", 12 pgs.
"U.S. Appl. No. 15/292,078, Non Final Office Action dated May 16, 2017", 11 pgs.
"U.S. Appl. No. 15/675,173, Response filed Aug. 15, 2019 to Non-Final Office Action dated Apr. 18, 2019", 13 pgs.
"U.S. Appl. No. 15/675,173, Examiner Interview Summary dated Sep. 23, 2020", 3 pgs.
"U.S. Appl. No. 15/675,173, Final Office Action dated Oct. 30, 2019", 18 pgs.
"U.S. Appl. No. 15/675,173, Non Final Office Action dated Apr. 18, 2019", 17 pgs.
"U.S. Appl. No. 15/675,173, Non Final Office Action dated Jun. 8, 2020", 20 pgs.
"U.S. Appl. No. 15/675,173, Notice of Allowance dated Dec. 16, 2020", 9 pgs.
"U.S. Appl. No. 15/675,173, Response filed Feb. 28, 2020 to Final Office Action dated Oct. 30, 2019".
"U.S. Appl. No. 15/675,173, Response filed Sep. 29, 2020 to Non Final Office Action dated Jun. 8, 2020", 14 pgs.
"Australian Application Serial No. 2013237658, Office Action dated Feb. 2, 2015", 5 pgs.
"Australian Application Serial No. 2013237710, Office Action dated Jan. 16, 2015", 3 pgs.
"Australian Application Serial No. 2014201580, Office Action dated Feb. 27, 2015", 2 pgs.
"Canadian Application Serial No. 2,807,899, Office Action dated Jul. 20, 2015", 3 pgs.
"Canadian Application Serial No. 2,807,899, Office Action dated Oct. 24, 2014", 4 pgs.
"Canadian Application Serial No. 2,828,264, Office Action dated Apr. 28, 2015", 4 pgs.
"Canadian Application Serial No. 2,829,266, Office Action dated Apr. 1, 2016", 4 pgs.
"Canadian Application Serial No. 2,829,266, Office Action dated Apr. 28, 2015", 3 pgs.
"Chapter 2: IBM InfoSphere DataStage stages", IBM Corp; Modification 0 of IBM Information Server, Version 8, Release 1, 1st Edition, (2008), 35-137.
"Delicious: Save, Organize, and Remember the Links You find Intersting or Useful Around the Web", [Online], Retrieved from the Internet: <URL: https://delicious.com/>, (2014), 1 pg.
"European Application Serial No. 13157474.1, Office Action dated Oct. 30, 2015", 5 pgs.
"European Application Serial No. 14159175.0, Office Action dated Feb. 4, 2016", 5 pgs.
"European Application Serial No. 14159175.0, Office Action dated Jul. 17, 2014", 10 pgs.
"European Application Serial No. 14159629.6, Extended European Search Report dated Jul. 31, 2014", 7 pgs.
"European Application Serial No. 14159629.6, Office Action dated Sep. 22, 2014", 2 pgs.
"European Application Serial No. 15159520.4, Extended European Search Report dated Jul. 15, 2015", 9 pgs.
"European Application Serial No. 16187129.8, Extended European Search Report dated May 30, 2017", 9 pgs.
"European Application Serial No. 17185392.2, Extended European Search Report dated Oct. 9, 2017", 9 pgs.
"European Application Serial No. 17185392.2, Response filed Aug. 13, 2018 to Extended European Search Report dated Oct. 9, 2017", 2 pgs.
"European Application Serial No. 17185392.2, Response filed Aug. 23, 2019 to Summons to Attend Oral Proceedings mailed Mar. 8, 2019", 6 pgs.
"European Application Serial No. 17185392.2, Summons to Attend Oral Proceedings mailed Mar. 8, 2019", 7 pgs.
"Frequently Asked Questions about Office Binder 97", [Online], Retrieved from the Internet: <URL: http://web.archive.org/web/20100210112922/http://support.microsoft.com/kb/843147>, (Accessed Dec. 18, 2006), 5 pgs.
"German Application Serial No. 102013221052.3, Office Action dated Mar. 24, 2015", w/English Translation, 17 pgs.
"German Application Serial No. 102013221057.4, Office Action dated Mar. 23, 2015", w/English Translation, 17 pgs.
"Great Britain Application Serial No. 1404574.4, Office Action dated Dec. 18, 2014", 2 pgs.
"Machine Code", Wikipedia, [Online], Retrieved from the Internet: <URL: http://en.wikipedia.org/wiki/Machine code>, (Accessed Aug. 11, 2014), 1-5.
"Netherlands Application Serial No. 2011613, Netherlands Search Report dated Aug. 13, 2015", W/ English Translation, 7 pgs.
"Netherlands Application Serial No. 2011627, Netherlands Search Report dated Aug. 14, 2015", W/ English Translation, 9 pgs.
"Netherlands Application Serial No. 2012437, Netherlands Search Report dated Sep. 18, 2015", W/ English Translation, 7 pgs.
"New Zealand Application Serial No. 616212, Notice of Allowance dated Jan. 23, 2015", 1 pg.
"New Zealand Application Serial No. 616299, Notice of Allowance dated Apr. 7, 2015", 1 pg.
"New Zealand Application Serial No. 616299, Office Action dated Jan. 26, 2015", 2 pgs.
"New Zealand Application Serial No. 622414, Office Action dated Mar. 24, 2014", 2 pgs.
"New Zealand Application Serial No. 622484, Office Action dated Apr. 2, 2014", 2 pgs.
"New Zealand Application Serial No. 622485, Notice of Allowance dated Nov. 24, 2014", 1 pg.
"New Zealand Application Serial No. 622485, Office Action dated Nov. 21, 2014", 1 pg.
"The FASTA Program Package", fasta-36.3.4, (Mar. 25, 2011), 1-29.
"This file does not have a program associated with it—what does this mean and what do I do?", Ask Leo! XP55374492, [Online], [Archived Apr. 18, 2015]. Retrieved from the Internet: <URL: :https://web.archive.org/web/20150418180501/https://askleo.com/this_file_does_not_have_a_program_associated_with_it_what_does_this_mean_and_what_do_i_do/>, (Apr. 18, 2015), 29 pgs.
"United Kingdom Application Serial No. 1404574.4, Office Action dated Dec. 18, 2014", 2 pgs.
Bae, Jinuk, et al., "Partitioning Algorithms for the Computation of Average Iceberg Queries", DaWaK2000, LNCS 1874, (2000), 276-286.
Ballesteros, Francisco, et al., "Batching: A Design Pattern for Efficient and Flexible Client/Server Interaction", Transaction on Pattern Language of Programming I, (c) Springer-Verlag Berlin Heidelberg 2009, (2009), 48-66.
Bogle, Phillip, et al., "Reducing Cross-Domain Call Overhead Using Batched Futures", SIGPLAN No. 29, 10, OOPSLA ' 94, (Oct. 1994), 341-354.
Bogle, Phillip, "Reducing Cross-Domain Call Overhead Using Batched Futures", Massachusetts Institute of Technology, (Submitted to the Dept, of Electrical Engineering and Computer Science in

(56) References Cited

OTHER PUBLICATIONS partial fulfillment of the requirement for the degree of Master of Science in Computer Science and Engineering), (1994), 1-96.

Bouajjani, Ahmed, et al., "Analysis of Recursively Parallel Programs", POPL'12, (Jan. 2012), 203-214.

Canese, Kathi, et al., "Chapter 2: PubMed: The Bibliographic Database", The NCBI Handbook, (Oct. 2002), 1-10.

Chazelle, Bernard, et al., "The Bloomier Filter: An Efficient Data Structure for Static Support Lookup Tables", SODA '04 Proceedings of the Fifteenth Annual ACMSIAM Symposium on Discrete Algorithms, (2004), 30-39.

Delcher, Arthur, et al., "Identifying Bacterial Genes and Endosymbiont DNA with Glimmer", BioInformatics, vol. 23, No. 6, (2007), 673-679.

Donjerkovic, Donko, et al., "Probabilistic Optimization of Top N Queries", Proceedings of the 25th VLDB Conference, (1999), 411-422.

Fang, Min, et al., "Computing Iceberg Queries Efficiently", Proceedings of the 24th VLDB Conference, (1998), 299-310.

Goldstein, Seth Copen, et al., "Stacks Lazy Threads: Implementing a Fast Parallel Call", Journal of Parallel and Distributed Computing, (Jan. 1996), 5-20.

Han, Jiawei, et al., "Efficient Computation of Iceberg Cubes with Complex Measures", ACM Sigmod,, (May 21-24, 2001), 1-12.

Ivanova, Milena, et al., "An Architecture for Recycling Intermediates in a Column-store", Proceedings of the 35th Sigmod International Conference on Management of Data, SIGMOD '09, (Jun. 29, 2009), 309-320.

Jacques, Mathieu, "An Extensible Math Expression Parser with Plug-ins", Code Project, [Online], Retrieved from the Internet: <URL: http://www.codeproject.com/Articles/7335/An-extensible-math-expression-parser-with-plug-ins>, (Mar. 13, 2008), 1-34.

Jenks, Stephen, et al., "Nomadic Threads: A Migrating Multithreaded Approach to Remote Memory Accesses in Multiprocessors", Parallel Architectures and Compilation Techniques, (Oct. 1996), 2-11.

Kahan, J., et al., "Annotea: an open RDF Infrastructure for Shared Web Annotations", Computer Networks vol. 39, No. 5, Elsevier Science Publishers B.V., Amsterdam, NL, (2002), 589-608.

Karp, Richard, et al., "A Simple Algorithm for Finding Frequent elements in Streams and Bags", ACM Transactions on Database Systems, vol. 28, No. 1, (Mar. 2003), 51-55.

Kitts, Paul, "Chapter 14: Genome Assembly and Annotation Process", The NCBI Handbook, (Oct. 2002), 1-21.

Leela, Krishna P, et al., "On Incorporating Iceberg Queries In Query Processors", Lecture Notes in Computer Science: Database Systems for Advanced Applications, vol. 2973, Springer Berlin Heidelberg, (2004), 431-442.

Liu, Hongyan, et al., "Methods for Mining Frequent Items in Data Streams: An Overview", Knowledge and Information Systems, vol. 26, No. 1, (Jan. 2011), 1-30.

Madden, "Chapter 16: BLAST Sequence Analysis Tool", The NCBI Handbook, (Oct. 2002), 1-15.

McDonough, Michele, "How to Import CSV and Other Delimited Files into Microsoft Access 2007", [Online] Retrieved from the Internet: <URL: http://www.brighthub.com/computing/windows-platform/articles/27511 ,aspx>, (Feb. 27, 2009), 3 pgs.

Mendes, Pablo, et al., "TcruziKB: Enabling Complex Queries for Genomic Data Exploration", IEEE International Conference on Semantic Computing, (Aug. 2008), 432-439.

Mizrachi, Ilene, "Chapter 1: GenBank: The Nucleotide Sequence Database", The NCBI Handbook, (Oct. 2002), 1-14.

Russell, Alastair, et al., "Nitelight: A Graphical Tool for Semantic Query Construction", University of Southhampton, UK, (2008), 1-10.

Sigrist, Christian, et al., "PROSITE, a Protein Domain Database for Functional Characterization and Annotation", Nucleic Acids Research, vol. 38, (2010), D161-D166.

Sirotkin, Karl, et al., "Chapter 13: The Processing of Biological Sequence Data at NCBI", The NCBI Handbook, (Oct. 2002), 1-11.

Smart, Paul, et al., "A Visual Approach to Semantic Query Design Using a Web-Based Graphical Query Designer", 16th International Conference on Knowledge Engineering and Knowledge Management (EKAW), (2008), 16 pgs.

Stamos, James, et al., "Remote Evaluation", ACM Transactions on Programming Languages and Systems, vol. 12, No. 4, (Oct. 1990), 537-565.

Wollrath, Ann, et al., "A Distributed Object Model for the Java System", Proceedings of the 2nd Conference on USENEX, Conference on Object-Orients Technologies and Systems, (Jun. 1996), 219-231.

U.S. Appl. No. 15/239,411, filed Aug. 17, 2016, User Interface Data Sample Transformer.

U.S. Appl. No. 15/675,173, U.S. Pat. No. 10,977,267, filed Aug. 11, 2017, User Interface Data Sample Transformer.

* cited by examiner

TRANSFORMATIONS

1. DEFINE STRUCTURE ASSIGN TOP ROW ELEMENTS AS COLUMN HEADERS

CONTROL MENU 602

| ID | NAME | COUNTRY | AGE | GENDER | HT | WT |
|---|---|---|---|---|---|---|
| 1 | O. HEAVISIDE | GB | 37 | M | 190 CM | 75 KG |
| 2 | H. LORENTZ | NL | 32 | M | 170 CM | 71 KG |
| 3 | R.P. FEYNMAN | US | 42 | M | 185 CM | 85 KG |
| 4 | P. DIRAC | GB | 54 | M | 187 CM | 81 KG |
| 5 | W. HEISENBERG | DE | 45 | M | 177 CM | 82 KG |
| 6 | M. CURIE | FR | 35 | F | 167 CM | 65 KG |
| 7 | R. NOYCE | US | 62 | M | 178 CM | 76 KG |
| 8 | A. TURING | GB | 23 | M | 165 CM | 76 KG |
| 9 | A. LOVELACE | GB | 26 | F | 159 CM | 76 KG |
| 10 | G. HOPPER | US | 43 | F | 150 CM | 82 KG |

BUILD

*FIG. 6B*

USER INTERFACE DATA SAMPLE TRANSFORMER

RELATED APPLICATIONS

This application is a continuation of Ser. No. 15/675,173, entitled "User Interface Data Sample Transformer," filed on Aug. 11, 2017, which claims the priority benefit of U.S. Provisional Application No. 62/495,587, entitled "User Interface Data Sample Transformer," filed on Aug. 17, 2016, which are hereby incorporated by reference in their entireties.

TECHNICAL FIELD

The present disclosure generally relates to the technical field of special-purpose machines that facilitate data manipulation and validation including computerized variants of such special-purpose machines and improvements to such variants, and to the technologies by which such special-purpose machines become improved compared to other special-purpose machines that facilitate data manipulation and validation. In particular, the present disclosure addresses systems and methods for user interface data sample based transformations of data.

BACKGROUND

In recent years, extremely large amounts of data have been generated by network-connected systems and users. The collected data may contain patterns that show malicious online behavior, e.g., behavior by malware or hackers, potential terrorism activities, potential sources of food poisoning, or even the best bike routes for a morning commute. Conventional data analysis tools have been unable to parse the extremely large amounts of data in human-understandable ways, thus the patterns remain hidden, e.g., signals lost in noise. Worse yet, much of the extremely large amounts of data is in an unstructured form which conventional data analysis tools cannot parse. Users attempting to add structure to the data encounter various types of errors, including program freezing and crashing. As is evident, there is a demand for improved approaches for structuring and analyzing extremely large sets of data.

BRIEF DESCRIPTION OF THE DRAWINGS

Various ones of the appended drawings merely illustrate example embodiments of the present disclosure and should not be considered as limiting its scope.

FIGS. 6A-6E illustrate example user interfaces for sample dataset-based transformation of large sets of data, according to some example embodiments.

DETAILED DESCRIPTION

Figure 1:
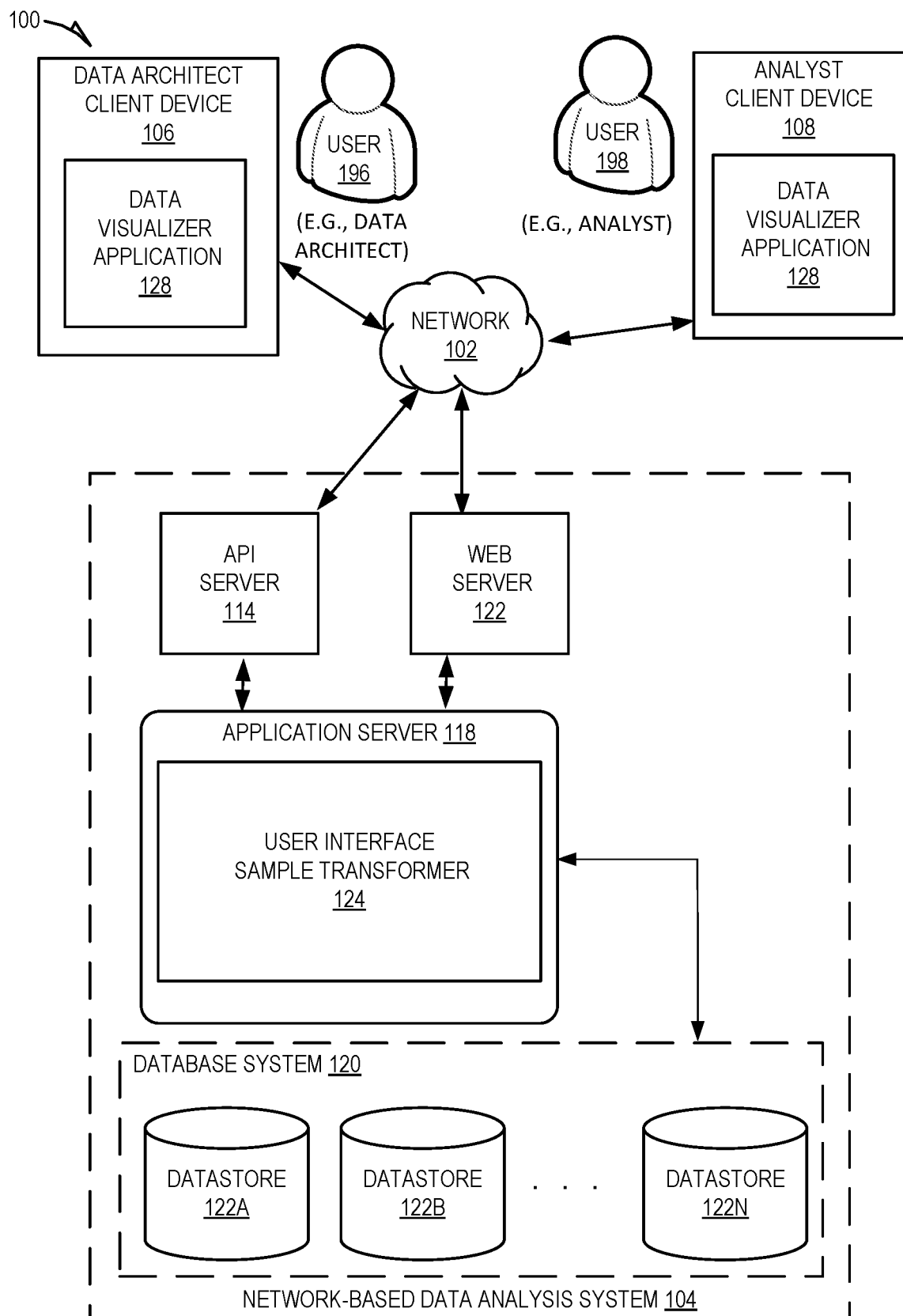
FIG. 1 is a block diagram illustrating a network-based data analysis system for a user interface (UI) sample dataset-based transformation of data, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, raw data can be imported and transformed using a sample portion of the raw data. The raw data may be unstructured or structured data. The transformations may define structure for the raw data, change pre-existing structure (e.g., schema) of the data, add or remove portions of the data, modify the data values, or modify data types assigned to data values in the raw data. To apply transformations, a sample portion of the raw data is displayed in a UI with a control menu. The control menu includes one or more transformation elements (e.g., buttons, drop-downs, fields) that are configured to apply transformations to the raw data. The transformations are applied to the sample portions of the data in real time or near real time, without applying the transformations to the raw data not in the sample. In this way, by applying each transformation only to the sample displayed in the UI, the user can see the changes applied to the sample and judge whether the transformations were applied properly and further determine whether additional transformations are need to further transform the raw data into structured data.

Once the user determines that no more transformations are necessary, the transformations are recorded as a transformation job that can be applied to the rest of the raw data (e.g., the raw data not included in the displayed sample set) stored in a backend database. The transformations on the rest of the raw data transform the raw data into a structured form per the transformation job recorded from the sample dataset transformations.

When newer raw data (e.g., raw data in the same raw unstructured format) is received, the transformation job is automatically applied to the new raw data, and stored with the structured data in the database backend. The newer raw data may comprise entirely new values in raw format or updates to the data already transformed and stored in a backend database. In some embodiments, the transformations specify types of validations to occur when transforming the data (e.g., exclude data outside a defined range of values, make sure a given column contains only integers). If, during the transformations, an error occurs due to one or more validations failing, an error message is generated; the user can ignore the error message, correct the error manually, or create a new transformation task to address future errors of the same type.

In this way, a user can effectuate transformations to arbitrarily large datasets (e.g., trillions of rows, thousands of columns) through a fast and responsive UI-based approach that shows the results of the transformations in real time and uses a transformation job to transform raw data into a structured form ready for analysis.

With reference to FIG. 1, an example embodiment of a high-level client-server-based network architecture 100 is shown. A network-based data analysis system 104 provides server-side functionality via a network 102 (e.g., the Internet or wide area network (WAN)) to one or more client devices 106 and 108. In some implementations, a data architect user (e.g., user 196) interacts with the network-based data analysis system 104 using the client device 106, and an analyst user (e.g., user 198) interacts with the network-based data analysis system 104 using client device 108. The data visualizer application 128 is an application to import, transform, and visualize data. For example, user 196 can use the data visualizer application 128 to import raw data and transform it for storage and later analysis. Further, user 198 can use the data visualizer application 128 to view the data transformed per user 196. In some embodiments, the data visualizer application 128 is run as local software executed by processors of the client device (e.g., client device 106 and client device 108). In some embodiments, the data visualizer application 128 is run from a web client (e.g., a browser) as a cloud service that works with application server 118 to provide cloud services (e.g., cloud-based data analysis).

In various implementations, the client devices 106 and 108 each comprise a computing device that includes at least a display and communication capabilities that provide access to the network-based data analysis system 104 via the network 102. The client device can be implemented as, but is not limited to, a remote device, work station, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth.

In some embodiments, the data visualizer application 128 accesses the various systems of the network-based data analysis system 104 via the web interface supported by a web server 122. Similarly, in some embodiments, the data visualizer application 128 can initiate tasks to be performed programmatically (e.g., automatically) without user input. In those example embodiments, the data visualizer application 128 can interface to perform the programmatic tasks through an Application Program Interface (API) server 114 located on the server side (e.g., within network-based data analysis system 104).

Users (e.g., the user 196 and 198) comprise a person, a machine, or other means of interacting with the client devices (e.g., client device 106 and 108). In some example embodiments, the user is not part of the network architecture 100, but interacts with the network architecture 100 via the client devices 106 and 108. For instance, the user 196 provides input (e.g., touch screen input or alphanumeric input) to the client device 106 and the input is communicated to the network-based data analysis system 104 via the network 102. In this instance, the network-based data analysis system 104, in response to receiving the input from the user 196, communicates information from application server 118 to the client device 106 via the network 102 to be presented to the user 196. In this way, according to some example embodiments, users can interact with the network-based data analysis system 104 using their respective client devices.

As illustrated in the example embodiment of FIG. 1, the API server 114 and the web server 122 are coupled to, and provide programmatic and web interfaces respectively to, one or more application server 118. The application server 118 can host a UI sample transformer 124 configured to receive raw data, and perform transformations on a sample of the raw data to record as a transformation job. As described in further detail below, the UI sample transformer 124 may create a sample of the raw data for display on data visualizer application 128 for transformation job generation. The portion of the raw data not included in the sample is stored in a database system (e.g., database backend), such as database system 120. In some example embodiments, the raw data not in the sample can be distributed across data stores 122A-N, which are configured to work as distributed data stores for a distributed database system.

In some example embodiments, the database system 120 is implemented as an Apache Hadoop-based system, which may implement Hadoop techniques (e.g., MapReduce) on Hadoop Distributed File System (HDFS) datastores, such as data stores 122A-N. It is appreciated that Hadoop and HDFS are mere examples of the database system 120 and features and file implementations may be modified. For example, in some embodiments, the data stores 122A-N are HDFS formatted files which can be transformed using Apache Spark functionality that is integrated into UI sample transformer 124.

Figure 2:
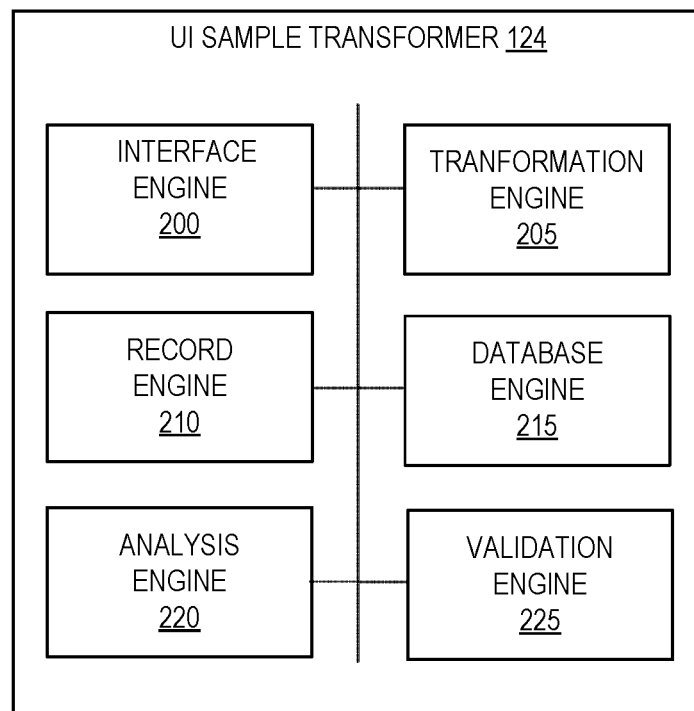
FIG. 2 is a block diagram illustrating example components forming part of a UI sample transformer, according to some example embodiments.

FIG. 2 illustrates a block diagram showing components provided within the UI sample transformer 124, according to some example embodiments. As is understood by skilled artisans in the relevant computer and Internet-related arts, each functional component (e.g., engine, module, or database) illustrated in FIG. 2 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single machine (e.g., a server) or may be distributed across several machines in various arrangements such as cloud-based architectures. Moreover, any two or more of these components may be combined into a single component (e.g., a single module), and the functions described herein for a single component may be subdivided among multiple modules.

As illustrated in FIG. 2, the UI sample transformer 124 comprises multiple engines that implement data transformation of raw data into structured data, according to some example embodiments. The components themselves are communicatively coupled (e.g., via appropriate interfaces) to each other and to various data sources, so as to allow information to be passed between the applications or so as to allow the applications to share and access common data. Although in FIG. 2 components, such as the transformation engine 205, are displayed within the UI sample transformer 124 on the server side, in some embodiments, one or more components of the UI sample transformer 124 may be integrated into a client-side program (e.g., data visualizer application 128) to improve responsiveness. To this end, the UI sample transformer 124 comprises an interface engine 200, a transformation engine 205, a record engine 210, a database engine 215, an analysis engine 220, and a validation engine 225.

The interface engine 200 manages generating and displaying user interfaces on the client devices 106 and 108 using the data visualizer application 128. In particular, the interface engine 200 generates a UI display of a sample dataset of data to be imported and control elements that can be manipulated by the user to effectuate changes to the displayed sample dataset. The transformation logic is provided by transformation engine 205, which is configured to receive specific transformation commands from the UI, apply the transformation commands to the sample dataset, and pass the resultant transformed data to the interface engine 200, which then transmits the resultant transformed data to the client device for display by the data visualizer application 128. How the transformations are applied and example types of transformations are discussed in further detail below, with reference to FIGS. 6A-6E.

In some example embodiments, the transformation engine 205 is located in the data visualizer application 128 and transformations are implemented by the client-side transformation engine 205 using a client side programming language (e.g., browser-executable code type, browser executed JavaScript, code executed locally by client device 106), which allow the user to quickly see the changes he/she is making to the sample dataset in real time or near real time, without waiting for the transformations to be applied to the full raw dataset, which may be many petabytes in size.

The record engine 210 is configured to record the applied transformations (e.g., types of transformations applied, and order of transformations applied) to the sample dataset. As with the transformation engine 205, in some embodiments, the record engine 210 is integrated into the data visualizer application 128 to record client-side transformations applied to the sample dataset. Upon a build command being selected, the record engine 210 uses the selected transformations to generate a transformation job, which is then transmitted to the UI sample transformer 124. The UI sample transformer 124 then applies the transformation job to the rest of the raw data stored in the database system 120.

In some embodiments, the record engine 210 is configured to generate the transformation job into a database-executable code type that executes across a distributed data storage system. In according to some example embodiments, the browser-executable code type cannot be natively run on the database as it is configured as client-side script (e.g., JavaScript) that can be used to quickly apply transformations to the sample dataset. Similarly, according to some example embodiments, the database-executable code type cannot be natively run on the browser because the database-executable code type is code configured for functional programming (e.g., MapReduce) on a database backend, not a client side browser.

As an example, assume a transformation to the sample dataset involves locating a delimiter value and deleting values that appear before the delimiter value (e.g., if the data is "firstName;lastName", the transformation would identify the delimiter ";" and delete the value before the delimiter, which is the "firstName" value). The transformation engine 205 may apply the process to the sample dataset directly, locating the specified delimiter and removing values that appear before the delimiter, and display the results directly in the display of the client device. In contrast, upon the build command being selected, the record engine 210 records the transformation as a task that may be applied in each node that manages each datastore (e.g., datastore 122A, datastore 122B). For example, the record engine 210 may record the task as part of a mapper code in a MapReduce sequence that can be applied across all the data stores concurrently (e.g., in parallel). Alternatively, according to some example embodiments, the record engine 210 records the task as part of an Apache Spark job to be performed by Spark workers across all data stores concurrently (e.g., in parallel).

The database engine 215 is configured to receive the transformation job from the record engine 210 and apply the transformations to the raw data in the data stores 122A-N in database system 120. As discussed, the database engine 215 may be implemented using different types of database systems (e.g., Apache Hadoop and HDFS, Oracle RDMS) and the record engine 210 transforms the code applied to the sample dataset (which is configured to only apply the transformation to the small displayed sample dataset) into code that can be applied at very large scales by the database engine 215.

The validation engine 225 manages validation logic for the transformations applied to the raw data. As new raw data is received, the validation engine 225 retrieves the transformation job that was created by the record engine 210 and instructs the database engine 215 to apply the transformation job to the new raw data to transform the new raw data into new structured data, to be added to the originally transformed data stored in the data stores 122A-N. The process of transforming new raw data into new structured data can be performed automatically by the UI sample transformer 124 (e.g., via validation engine 225) without requiring the user to redo the transformations on the sample dataset to create the transformation job. If an error is encountered while transforming the new raw data, the validation engine 225 generates an error for the user to address. To address the error, the user may correct the faulty values in the new raw data, the user can choose to ignore the error, or the user can create a new transformation task to be included as part of the transformation job so that future errors are avoided.

In this way, an architect user (e.g., user 196) can quickly set up a distributed workflow that automatically transforms raw data into structured data for analysis, and further ensure that new raw data is automatically structured and added to the previous data. Other users, such as user 198, can analyze the structured data using the data visualizer application 128. Because the potentially large set of transformed data is handled on the backend (e.g., across data stores 122A-122N), the analyst user 198 can quickly apply filters to the data to hone the data down to understandable results. To this end, the analysis engine 220 is configured to generate filtered commands that the database engine 215 can use to retrieve filtered data from data stores 122A-N. Further, because new data is automatically transformed using the pre-configured transformation job, the analyst user 198 can simply use a refresh command to check whether new data has been added to the data stores 122A-N, instead of rerunning a transformation job on the entire dataset.

Figure 3:
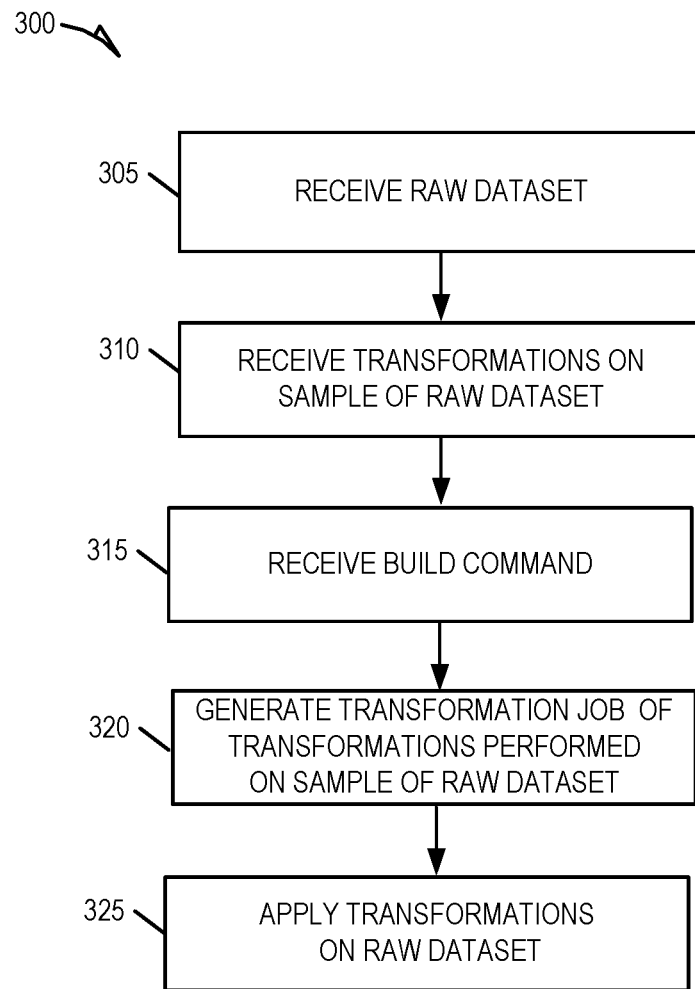
FIG. 3 is a flow diagram illustrating a method of transforming large sets of data using a UI sample-based approach, according to some example embodiments.

FIG. 3 illustrates a flow diagram for a method 300 of transforming large sets of data using the UI sample dataset-based approached, according to some example embodiments. At operation 305, the UI sample transformer 124 receives raw data (e.g., an input dataset) to be transformed. In some example embodiments, the raw data is in non-validated form in that further changes are required to make the data valid or parsable by the data visualizer application 128. For example, the raw data may be in unstructured form (e.g., lists without delimiters, images). As a further example, the raw data may have some structure, such as columns, but the user still desires to transform the data to a desired structure so that the data can be parsed and analyzed. The database engine 215 stores the raw data in the database system 120 and partitions off a sample of the raw data to be displayed by the interface engine 200.

At operation 310, the transformation engine 205 receives one or more transformations from the user (e.g., user 196). In response, the transformation engine 205 applies the received transformations to the sample dataset, and displays the result on the data visualizer application 128. At operation 315, the UI sample transformer 124 receives the build command from the user through the user interface. At operation 320, the record engine 210, in response to receiving the build command, generates a transformation job that includes the one or more transformations received at operation 310. In some embodiments, the record engine 210 records the transformations by translating the transformations from commands to be applied to the sample dataset (e.g., command to be run on a single table) into commands that run on at a large scale on database system 120, e.g., distributed database commands. At operation 325, the database engine 215 applies the transformation job to the raw dataset to transform the raw dataset into a structured format. For instance, the transformation job applies each of the transformations performed on the sample dataset to the raw dataset, thereby transforming the raw dataset into a structured dataset.

Figure 4:
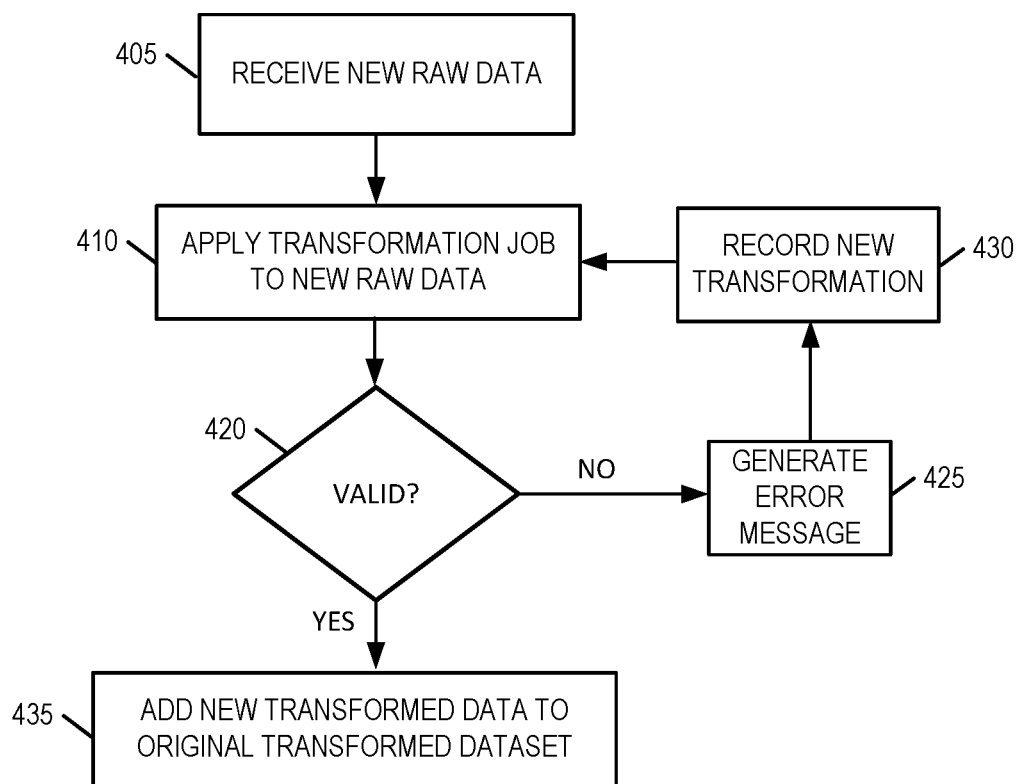
FIG. 4 is a flow diagram illustrating a method of transforming newly received large sets of data using a pre-generated transformation job and validation, according to some example embodiments.

FIG. 4 shows a flow diagram for a method 400 of transforming new raw data and validations, according to some example embodiments. Validations are performed to ensure newer data is transformed by the transformation job properly (e.g., so that the newly received data can be added to the already transformed structured data in data stores 122A-N). An example validation includes checking that certain types of data are in certain forms (e.g., check that a given column contains only string characters). A further example of a validation is checking whether values are within a given range (e.g., checking that the values in a given column are between a minimum and maximum value, checking that the values of a given column are within some standard deviation value of the total values in the column).

At operation 405, the UI sample transformer 124 receives new raw data to be transformed. The database engine 215 automatically transfers (e.g., upon receipt by the UI sample transformer 124) the new data to the database system 120 for storage in data stores 122A-N. Because the raw data is not yet structured, the newer raw data is stored in a staging partition in the data stores 122A-N.

In the example of FIG. 4, the new raw data is in the same or similar form as the original raw data for which the transformation job was created. In some embodiments, the new raw data is assumed to be in the same form because the data was uploaded from the same source (e.g., user uploads more data to the transformation job project). In some embodiments, the user 196 determines that the newer data is in the same or similar form as the original raw data and, accordingly, the user 196 chooses the same transformation job (e.g., the transformation job created to transform the original raw data) for application to the newer data. In some example embodiments, the UI sample transformer 124 creates a project session for each transformation job, and if a user (e.g., user 196) uploads the data to the project session, the UI sample transformer 124 automatically applies the transformation job for that project session.

In some embodiments, the user (e.g., user 196) manually uploads the new raw data, and then manually selects the transformation job to be applied to the new raw data. For example, the user may visually ascertain that the new raw data is in the same unstructured format as the original raw data (e.g., the raw data received in operation 305, in FIG. 3) and accordingly select the same transformation job (e.g., the transformation job created at operation 320, of FIG. 3).

At operation 410, the database engine 215 applies the transformation job to the new raw data stored in the staging partition of the data stores 122A-N. At operation 420, if the database engine 215 encounters an error when applying the transformation job to the new raw data, the error is passed to the validation engine 225 for operation 425. For example, if a transformation to be applied is configured to identify a semi-colon as a delimiter, and a given value does not have a delimiter, the database engine 215 determines that validation has failed at operation 420 because there is an error in the data (e.g., missing delimiter). At operation 425, the validation engine 225 receives the error (e.g., error data received from database engine 215) and generates an error message for the user (e.g., user 196) to manage the error. In some example embodiments, the validation error is due to failure of a transformation task. For example, if a transformation task specifies that a given column is to have its values transformed from an integer data type to floating point data type, and the column contains strings, then the transformation task may fail as the database engine 215 may not be configured to transform strings to floating point data types.

To address a validation error, in some embodiments, the database engine 215 ignores the error and the values that caused the error are left in uncorrected form in the newer transformed dataset. In some embodiments, the user corrects the values that caused the error (e.g., by deleting a stray delimiter in the new raw data that caused an error). In some embodiments, particularly those where the error is widespread throughout the newer raw data, the transformation engine 205 receives from the user (e.g., user 196) a new transformation task to be included in the transformation job to address the error, as illustrated at operation 430. Once the error is handled (e.g., by correcting the error or creating a new transformation) the transformation job is again reapplied to the newer raw data at operation 410.

At operation 435, if the database engine 215 does not encounter errors when applying the transformation job to the new raw data, the new raw data is thereby transformed into new structured data, and is added to the partition that stores the originally transformed raw data in data stores 122A-N.

Once the data is transformed into structured data and stored in database system 120, the data visualizer application 128 allows users (e.g., user 198) to quickly retrieve, filter, and analyze the information. Furthermore, in contrast to past approaches, because new raw data is automatically transformed using the transformation job, the analyst user (e.g., user 198) does not have to run a full transformation job his/herself to analyze the latest data.

Figure 5:
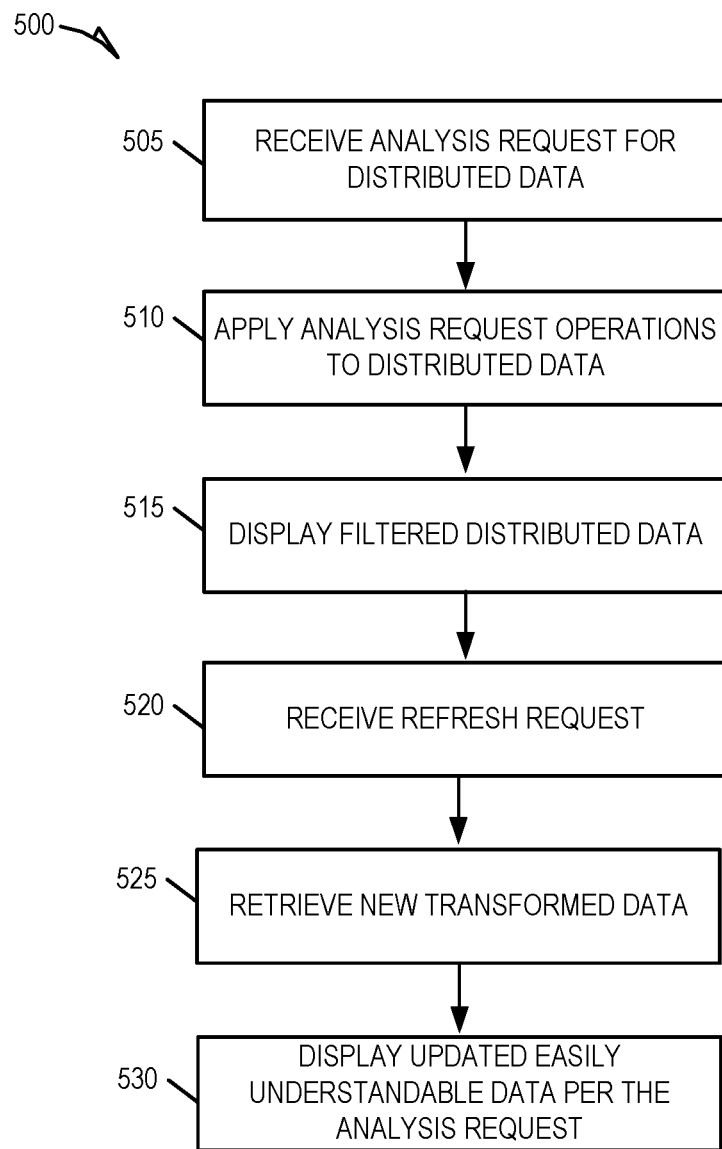
FIG. 5 is a flow diagram illustrating a method of analyzing the original and newly received data, according to some example embodiments.

FIG. 5 shows a flow diagram for a method 500 of analyzing structured data transformed using the approaches disclosed herein, according to some example embodiments. At operation 505, the analysis engine 220 receives an analysis request from an analyst user (e.g., user 198). The analysis request may be a request to filter out portions of the structured data (e.g., return data only matching certain ranges) and/or visualize the structured data using a data visualization graph (e.g., social network graph, histogram).

At operation 510, the database engine 215 receives the analysis request and applies operations of the analysis request to the structured data. For example, if the analysis request of operation 505 requests only rows having a value between a minimum and maximum, the database engine 215 formulates a query configured to run on database system 120 and retrieves the matching rows from the structured data.

The database engine 215 then transmits the matching rows to the analysis engine 220 for further visualization or other operations specified in the analysis request. At operation 515, the analysis engine 220 displays the requested analysis results to the user through a display of the data visualizer application 128.

As an illustrative example, and strictly as a non-limiting example, assume that the new raw data and all of operations of FIG. 4 occurred between operations 515 and 520 of FIG. 5. That is, assume that after viewing the requested analysis data, newer data is received and transformed using the transformation job, and further that the transformed data is stored in the distributed database system 120. Continuing, further assume that at operation 520, the user (e.g., user 198) wants to refresh the data to get the latest data for analysis. Conventionally, the user would have to run the transformation job on the newly received data, or wait for other users with expertise to transform the data. However, using the approach here, the transformation job was quickly created using the sample-based approach. That is, through verifying that the transformations produce the desired structured data using a sample dataset, automatically applying the transformations at-scale on the back end to transform the entire large dataset, and constantly transforming newly received data using the sample-dataset-created transformation job, users of the data visualizer application 128 can transform and analyze data in an efficient, accurate way.

At operation 520, the analysis engine 220 receives an update request from the analyst user (e.g., user 198). The update request is a type a refresh requests configured to check whether any new data has been added to the data being analyzed (e.g., the transformed data stored in data stores 122A-N). At operation 525, the database engine 215 retrieves data matching the operations of the analysis request. At operation 530, the analysis engine 220 display the requested data using one or more graphical data visualizations (e.g., network graph, point plot, histogram).

FIGS. 6A-6E depict example user interfaces for the UI sample transformer 124, according to some embodiments. Although FIGS. 6A-6E depict specific example user interfaces and user interface elements, these are merely non-limiting examples; many other alternate user interfaces and user interface elements can be generated by UI sample transformer 124 and data visualizer application 128. It will be noted that alternate presentations of the displays of FIGS. 6A-6E can include additional information, graphics, options, and so forth. Alternatively, other presentations can include less information, or provide abridged information for easy use by the user.

Figure 6A:
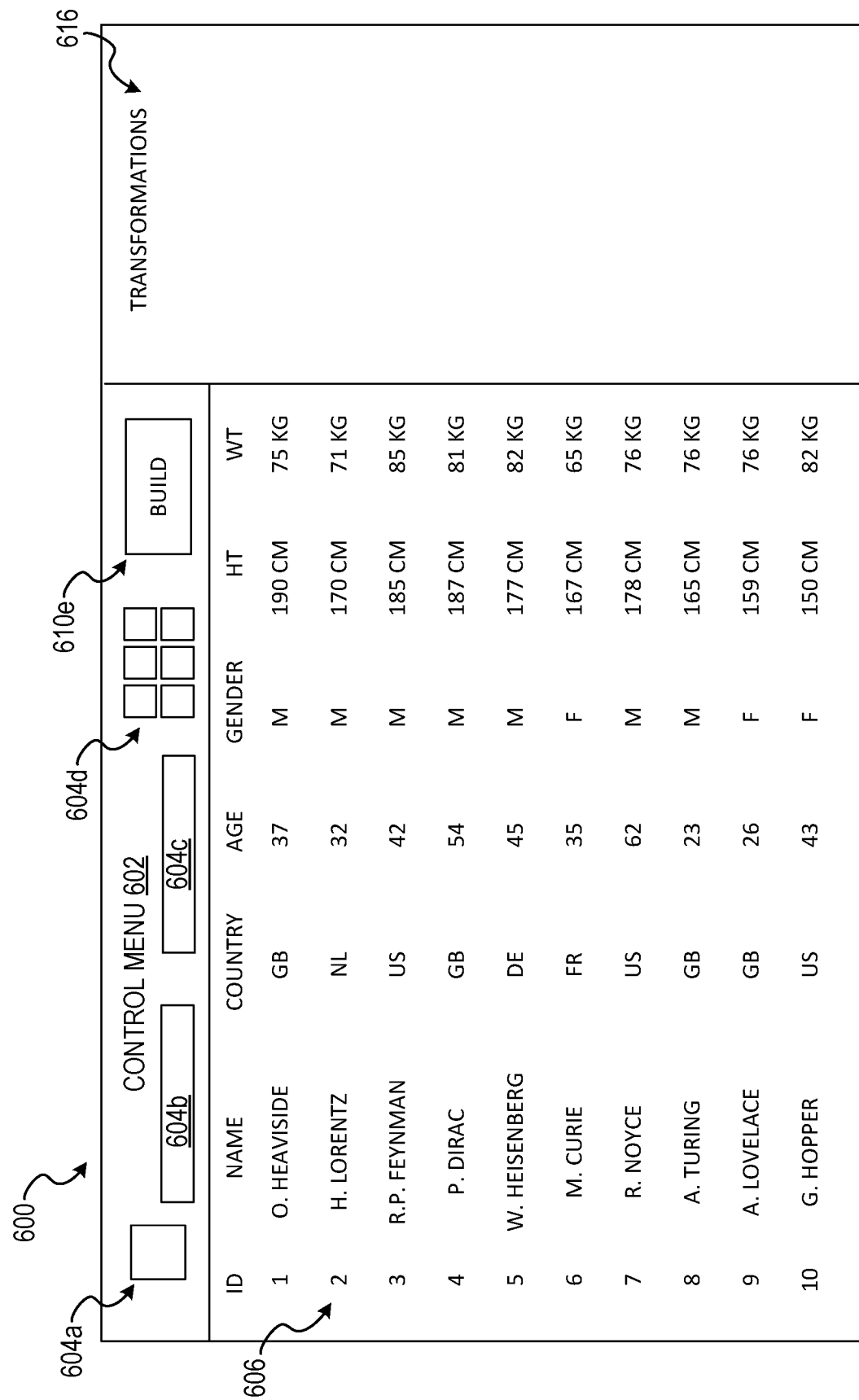

FIG. 6A shows a graphical user interface 600 for transforming data according to some example embodiments. The user interface 600 includes a control menu 602 with display objects 604a-e (e.g., buttons, drop-downs, fields) that are selectable by a user (e.g., user 196, user 198) for uploading raw data, applying transformations, selecting filters and graphical visualizations, and other operations discussed herein. For instance, display object 604a can be configured as a data upload tool that allows a user (e.g., user 196) to select raw data for upload to the application server 118 and UI sample transformer 124. As discussed above, a sample dataset 606 of the raw data that represents the unstructured form of the data to be uploaded (e.g., the sample data is subset of the raw dataset that is stratified to accurately represent the raw dataset) is displayed within a portion of user interface 600. The user (e.g., user 196) can use transformation display objects 604b and 604c to perform different transformations on the sample dataset 606. Though only two display objects are displayed as transformation display objects in FIG. 6A-E, it is appreciated that in some example embodiments, more transformation display objects can be included in control menu 602, in different menus and areas within user interface 600, or as pop-up menus that appear upon selecting or visually manipulating data values within sample dataset 606. Display object(s) 604d can be options for graphical visualizations to be applied to the sample dataset 606 and/or the transformed full dataset. The transformations selected by the user (e.g., user 196) are displayed in the transformation area 616. When a user (e.g., user 196) has completed transformations of the sample dataset 606, he/she may select the build display object 610e, which triggers the record engine 210 to generate a transformation job from each of the applied transformations.

FIG. 6B shows the result of a first sample transformation on the sample dataset 606 through the user interface 600, according to some example embodiments. In the example shown in FIG. 6B, the user (e.g., user 196) defined that each row in the top row of the sample dataset 606 is a header for the column of values below each top row value (e.g., the "name" value is a header for a column of name values for each of the rows or entries below the top row). Consequently, transformation engine 205 identifies the sample dataset 606 as a table with columns having values set by the top row values. The first transformation is shown as a first transformation task in the transformation area 616.

Figure 6C:
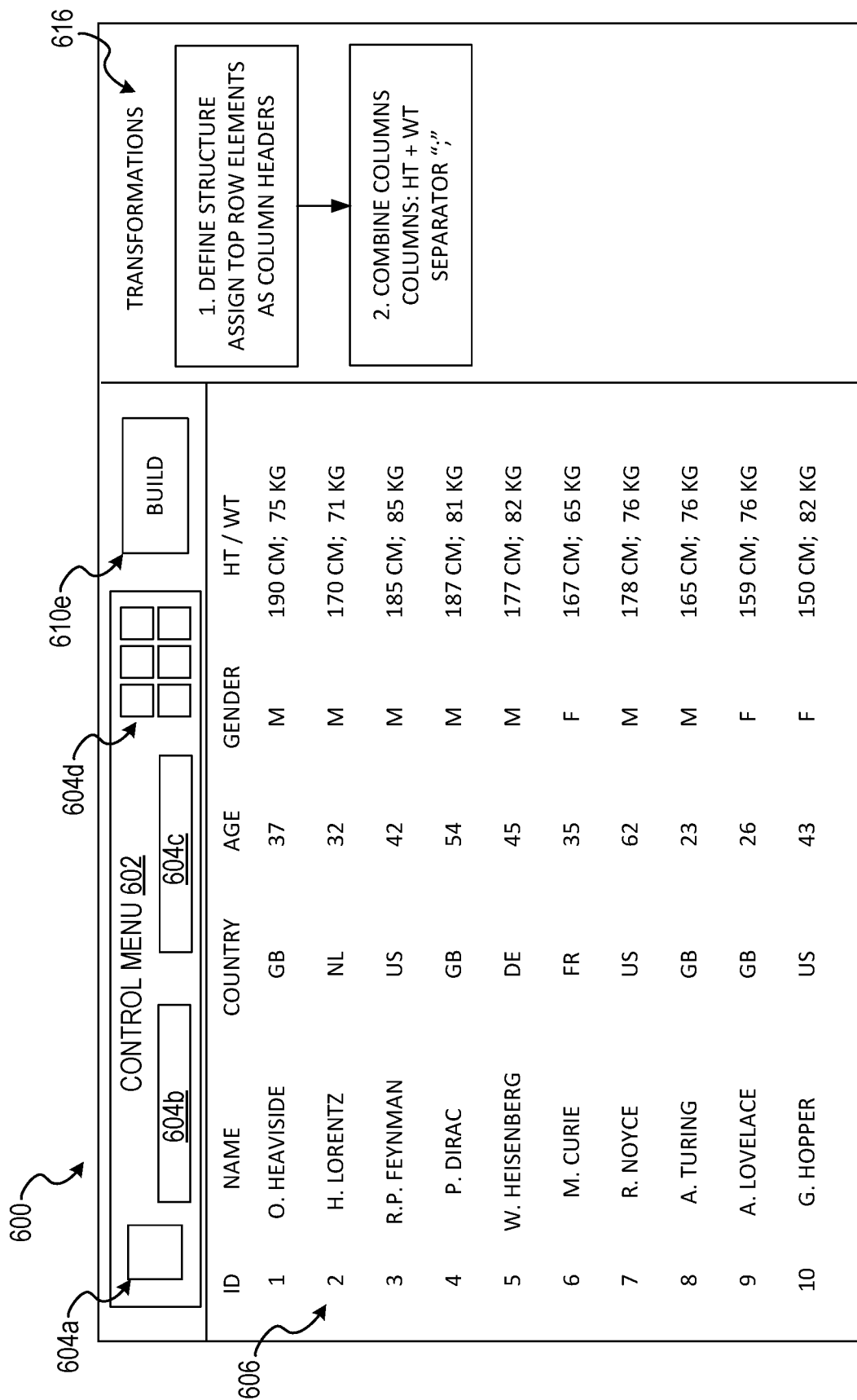

FIG. 6C shows the result of a second sample transformation on the sample dataset 606 through the user interface 600, according to some example embodiments. In the example shown in FIG. 6C, the user (e.g., user 196) combined two columns, the height column ("HT") and the weight column ("WT)" into a single column, with the below values to be separated by a semi-colon delimiter (";"). Consequently, as illustrated, the two columns are combined into a single column with the corresponding column values per row separated by the semi-colon delimiter. The second transformation is shown as a second transformation task in the transformation area 616.

Figure 6D:
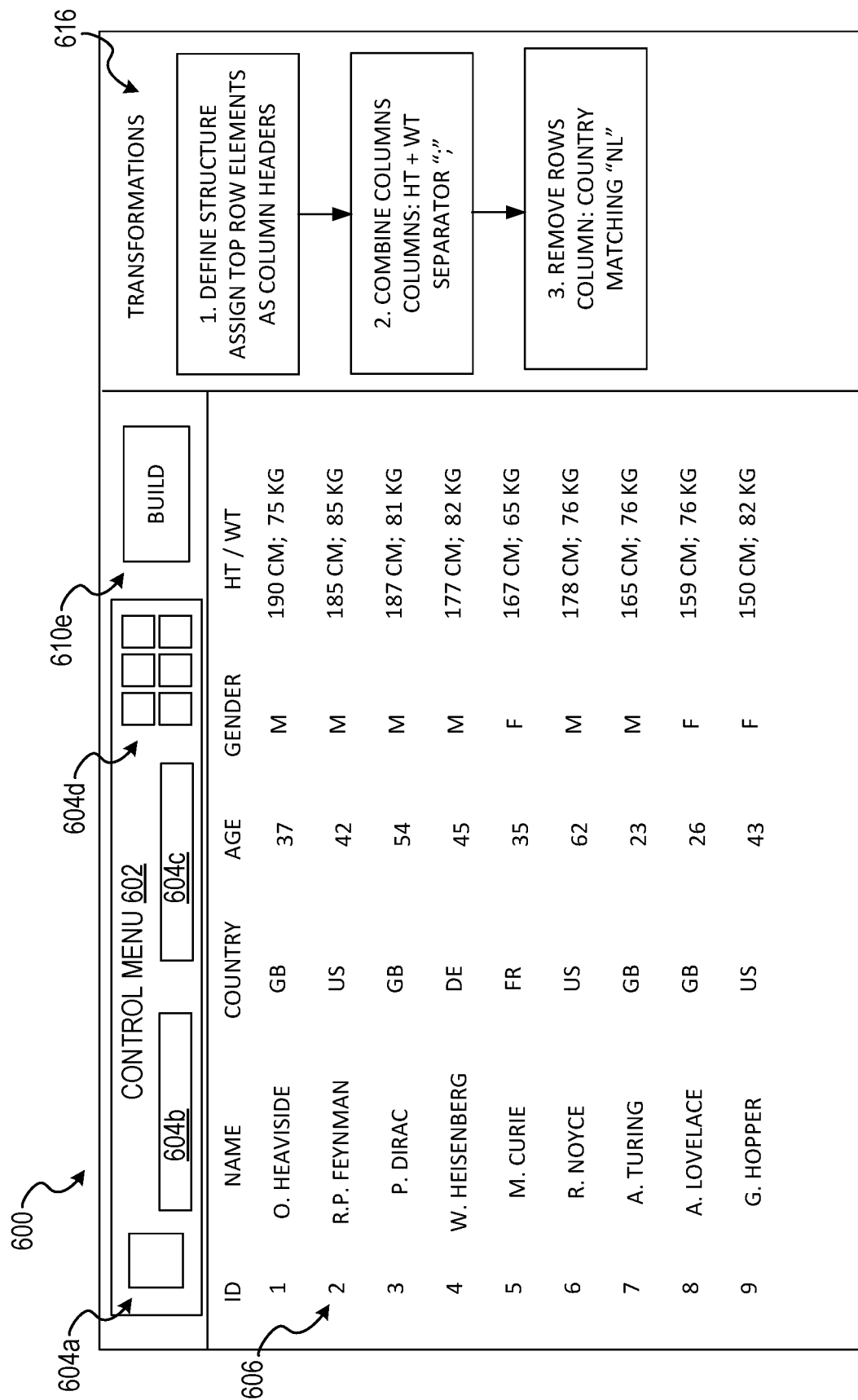

FIG. 6D shows the result of a third sample transformation on the sample dataset 606 through the user interface 600, according to some example embodiments. In the example shown in FIG. 6D, the user (e.g., user 196) removed rows that have the value of "NL" in the "Country" column. Consequently, as shown in FIG. 6D, the second row (which contained data for the person "H. Lorentz") has been removed, as that entry has "NL" in the country column. The third transformation is shown as a third transformation task in the transformation area 616.

Figure 6E:
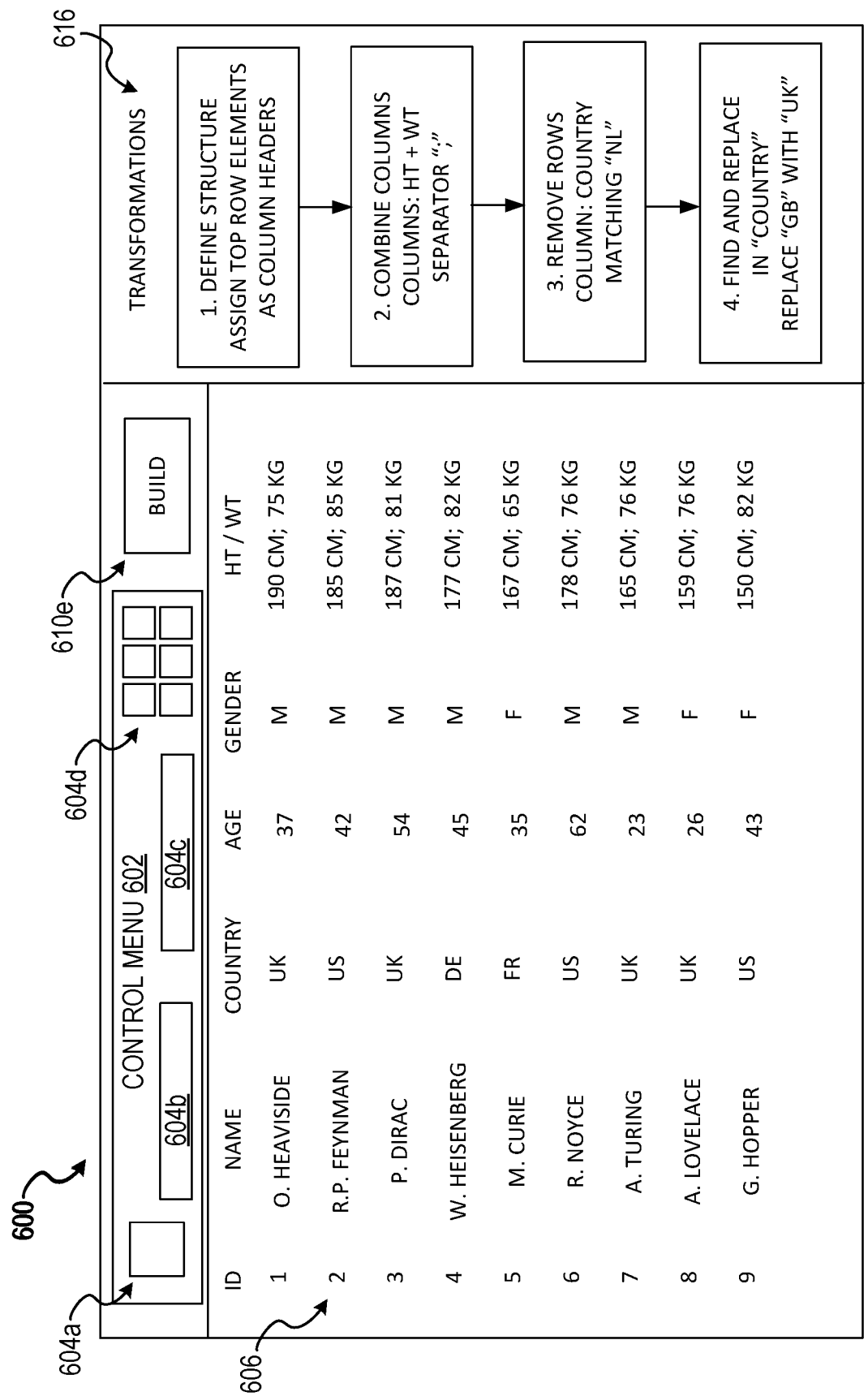

FIG. 6E shows the result of a fourth sample transformation on the sample dataset 606 through the user interface 600, according to some example embodiments. In the example shown in FIG. 6E, the user (e.g., user 196) used a find and replace transformation to find and replace any value in the column "Country" that matches "GB" and replace the value with the value "UK". Consequently, as shown in FIG. 6E, the first, third, seventh, and eight columns have their column values replaced per the transformation. The fourth transformation is shown as a fourth transformation task (e.g., validation transformation) in the transformation area 616.

After the user 196 is finished transforming the sample dataset 606, the user 196 selects the build display object 610e. In response to the build display object 610e being selected, the record engine 210 identifies each of the transformations tasks (e.g., validation transformations) applied to the sample dataset 606 and generates a transformation job in code that is configured to run on the backend, at scale (e.g., runnable in parallel across data stores 122A-N). The record engine 210 then passes the transformation job code to the database engine 215, which applies the transformation job to raw data in the database system 120 to transform the raw data to structured data that matches the changes made to the sample dataset 606.

Figure 7:
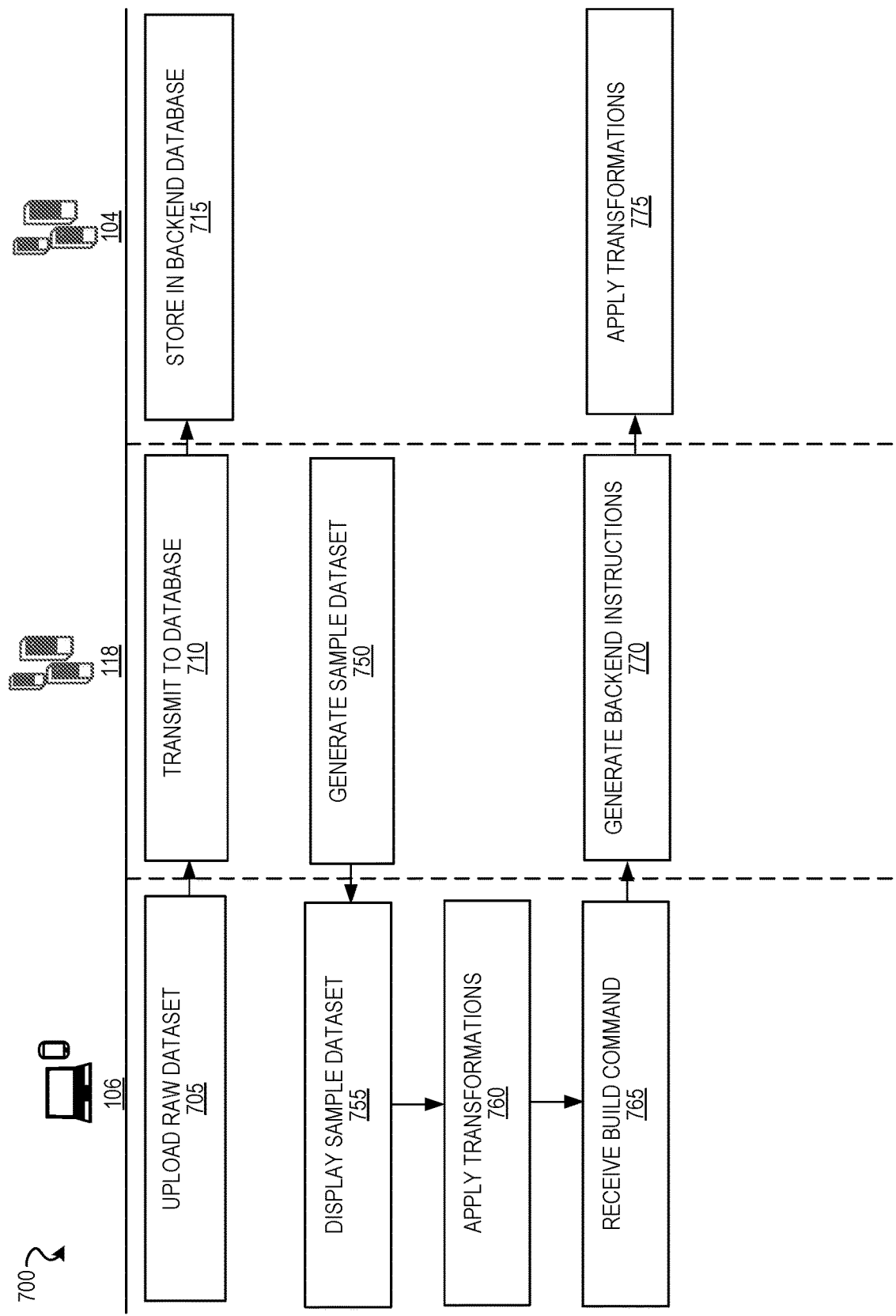
FIG. 7 is a network interaction diagram illustrating sample-based transformation of large datasets in a network environment, according to some example embodiments.

FIG. 7 shows a network interaction diagram 700 showing network interactions for UI sample dataset-based transformations to large sets of data, according to some embodiments. As illustrated, the computing entities include the client device 106, which runs the data visualizer application 128, which communicates over network 102 (represented by a vertical dashed line) to the application server 118, which hosts the UI sample transformer 124, and which further issues instructions to the database system 124 over a network (represented by an additional vertical dashed line).

At operation 705, using the client device 106, the user 196 uploads the raw dataset to the application server 118. At operation 710, the UI sample transformer 124 (e.g., the database engine 215) stores the uploaded raw data to the network-based data analysis system 104. At operation 715, the network-based data analysis system 104 receives the raw dataset from the UI sample transformer 124 and stores it in a database, e.g., in distributed form across data stores 122A-N.

At operation 750, the database engine 215 generates a sample dataset of the uploaded raw data for UI-based transformations. According to some example embodiments, the sample dataset should be small enough to maintain responsiveness in a UI on client device 106. For example, the sample dataset may comprise all of the columns (e.g., schema) for a given dataset but only a small number of rows (e.g., less than 100). In this way, the transformations applied to the sample dataset will yield the same results when applied to the large raw dataset because the sample dataset accurately reflects the schema structure of the raw dataset, but only over a few rows.

At operation 755, the client device 106 displays the sample dataset, as illustrated in FIG. 6A. At operation 760, the user 196 applies one or more transformations to the dataset, as illustrated in FIGS. 6B-6E. At operation 765, in response to the user 196 selecting the build display object 610e, the record engine 210 generates a transformation job configured to run on the network-based data analysis system 104. At operation 770, the database engine 215 receives the transformation job code and applies the transformation job to the raw data in the network-based data analysis system 104. For example, the network-based data analysis system 104 receives instructions from the database system 120 and applies the transformations on the raw data across the data stores 122A-N in parallel.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations. The modules, methods, applications and so forth described in conjunction with FIGS. 1-7 are implemented in some embodiments in the context of a machine and an associated software architecture. The sections below describe representative software architecture and machine (e.g., hardware) architecture that are suitable for use with the disclosed embodiments.

Figure 8:
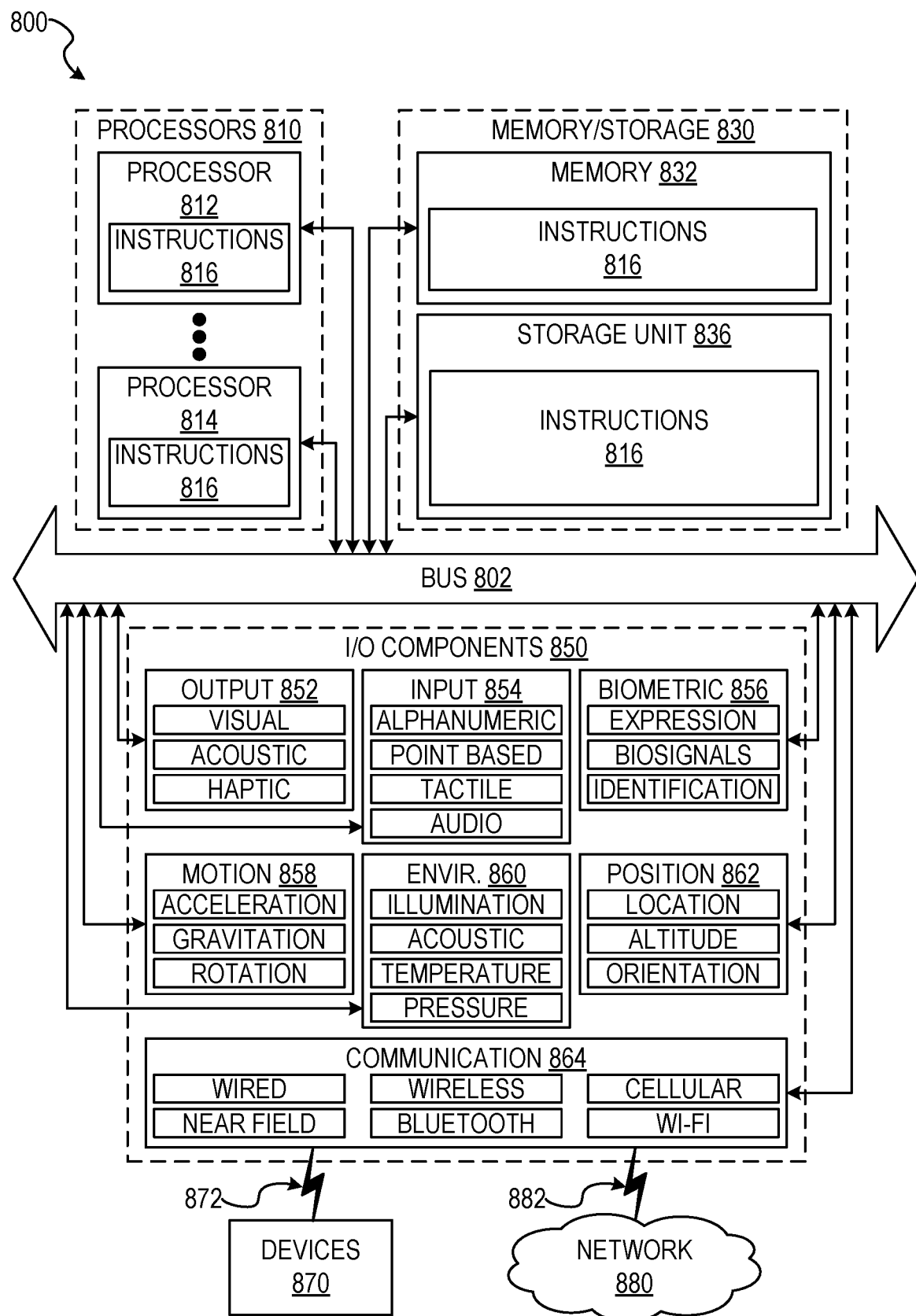
FIG. 8 illustrates a diagrammatic representation of a machine in the form of a computer system within which a set of instructions may be executed for causing the machine to perform any one or more of the methodologies discussed herein, according to an example embodiment.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein can be executed. For example, the instructions 816 can cause the machine 800 to execute the flow diagrams of FIGS. 3-5 and network interaction diagram of FIG. 7. Additionally, or alternatively, the instructions 816 can implement the interface engine 200, transformation engine 205, record engine 210, database engine 215, analysis engine 220, and validation engine 225 of FIG. 2, and so forth. The instructions 816 transform the general, non-programmed machine into a particular machine 800 programmed to carry out the described and illustrated functions in the manner described. In alternative embodiments, the machine 800 operates as a standalone device or can be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 can include processors 810, memory/storage 830, and I/O components 850, which can be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 812 and processor 814 that may execute instructions 816. The term "processor" is intended to include multi-core processor that may comprise two or more independent processors (sometimes referred to as "cores") that can execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiples cores, or any combination thereof.

The memory/storage 830 can include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 can also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of the processors 810 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 can include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 can include many other components that are not shown in FIG. 8. The I/O components 850 are grouped according to functionality merely for simplifying the following discussion, and the grouping is in no way limiting. In various example embodiments, the I/O components 850 can include output components 852 and input components 854. The output components 852 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 850 can include biometric components 856, motion components 858, environmental components 860, or position components 862 among a wide array of other components. For example, the biometric components 856 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 can include acceleration sensor components (e.g., an accelerometer), gravitation sensor components, rotation sensor components (e.g., a gyroscope), and so forth. The environmental components 860 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 862 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 850 may include communication components 864 operable to couple the machine 800 to a network 880 or devices 870 via a coupling 882 and a coupling 872, respectively. For example, the communication components 864 include a network interface component or other suitable device to interface with the network 880. In further examples, communication components 864 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 870 may be another machine or any of a wide variety of peripheral devices (e.g., a peripheral device coupled via a Universal Serial Bus (USB)).

Moreover, the communication components 864 can detect identifiers or include components operable to detect identifiers. For example, the communication components 864 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 864, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 880 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or other type of cellular or wireless coupling. In this example, the coupling 882 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816 can be transmitted or received over the network 880 using a transmission medium via a network interface device (e.g., a network interface component included in the communication components 864) and utilizing any one of a number of well-known transfer protocols (e.g., Hypertext Transfer Protocol (HTTP)). Similarly, the instructions 816 can be transmitted or received using a transmission medium via the coupling 872 (e.g., a peer-to-peer coupling) to devices 870. The term "transmission medium" shall be taken to include any intangible medium that is capable of storing, encoding, or carrying the instructions 816 for execution by the machine 800, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The invention claimed is:

1. A system comprising:
   one or more computer processors; and
   one or more computer-readable mediums storing instructions that, when executed by the one or more computer processors, cause the system to perform operations comprising:
   receiving a request to apply a set of data transformations to convert an input data set into a validated format that can be parsed by a data visualization application;
   executing the set of data transformations on a sample dataset that is a subset of the input data set, wherein executing the set of data transformations yields one or more errors;
   causing presentation of data identifying the one or more errors;
   receiving one or more additional data transformations to convert the dataset into the validated format;
   executing an updated set of data transformations to the sample data set, the updated set of data transformations being based on the set of data transformations and the one or more additional data transformations, wherein execution of the updated set of data transformations completes without error; and
   executing the updated set of data transformations on the input dataset to convert the input dataset into the validated format.

2. The system of claim 1, the operations further comprising:
   receiving the input data set in a non-validated format that cannot be parsed by the data visualization application.

3. The system of claim 1, the operations further comprising:
   generating database-executable code defining the updated set of data transformations based on browser-executable code defining the data transformations, the browser-executable code having been used to execute the updated set of data transformations to the sample data set.

4. The system of claim 1, wherein the data visualization application is configured to parse the input data in the validated format to cause a visualization of the input data, the visualization including at least one of: a point plot, a network graph, or a histogram.

5. The system of claim 1, the operations further comprising:
   receiving an additional input dataset in the non-validated format; and
   in response to receiving the additional input dataset, automatically executing the updated set of data transformations to convert the additional input dataset into the validated format.

6. The system of claim 5, the operations further comprising:
   receiving a request to filter a portion of the input dataset that is in the validated format;
   in response to receiving the request, generating a first filtered dataset extracted from the input dataset that is in the validated format;
   receiving a refresh request for the first filtered dataset; and in response to receiving the refresh request, generating a second filtered dataset that includes validated data from the additional input dataset in the validated format.

7. The system of claim 1, wherein the set of data transformations and the one or more additional data transformations are received via a graphical user interface (GUI) comprising one or more display objects that are configured to initiate pre-configured transformations to datasets using a browser-executable code type upon the one or more display objects being selected through the GUI.

8. A method comprising:
receiving a request to apply a set of data transformations to convert an input data set into a validated format that can be parsed by a data visualization application;
executing the set of data transformations on a sample dataset that is a subset of the input data set, wherein executing the set of data transformations yields one or more errors;
causing presentation of data identifying the one or more errors;
receiving one or more additional data transformations to convert the dataset into the validated format;
executing an updated set of data transformations to the sample data set, the updated set of data transformations being based on the set of data transformations and the one or more additional data transformations, wherein execution of the updated set of data transformations completes without error; and
executing the updated set of data transformations on the input dataset to convert the input dataset into the validated format.

9. The method of claim 8, further comprising:
receiving the input data set in a non-validated format that cannot be parsed by the data visualization application.

10. The method of claim 8, further comprising:
generating database-executable code defining the updated set of data transformations based on browser-executable code defining the data transformations, the browser-executable code having been used to execute the updated set of data transformations to the sample data set.

11. The method of claim 8, wherein the data visualization application is configured to parse the input data in the validated format to cause a visualization of the input data, the visualization including at least one of: a point plot, a network graph, or a histogram.

12. The method of claim 8, further comprising:
receiving an additional input dataset in the non-validated format; and
in response to receiving the additional input dataset, automatically executing the updated set of data transformations to convert the additional input dataset into the validated format.

13. The method of claim 12, further comprising:
receiving a request to filter a portion of the input dataset that is in the validated format;
in response to receiving the request, generating a first filtered dataset extracted from the input dataset that is in the validated format;
receiving a refresh request for the first filtered dataset; and
in response to receiving the refresh request, generating a second filtered dataset that includes validated data from the additional input dataset in the validated format.

14. The method of claim 8, wherein the set of data transformations and the one or more additional data transformations are received via a graphical user interface (GUI) comprising one or more display objects that are configured to initiate pre-configured transformations to datasets using a browser-executable code type upon the one or more display objects being selected through the GUI.

15. A non-transitory computer-readable medium storing instructions that, when executed by one or more computer processors of one or more computing devices, cause the one or more computing devices to perform operations comprising:
receiving a request to apply a set of data transformations to convert an input data set into a validated format that can be parsed by a data visualization application;
executing the set of data transformations on a sample dataset that is a subset of the input data set, wherein executing the set of data transformations yields one or more errors;
causing presentation of data identifying the one or more errors;
receiving one or more additional data transformations to convert the dataset into the validated format;
executing an updated set of data transformations to the sample data set, the updated set of data transformations being based on the set of data transformations and the one or more additional data transformations, wherein execution of the updated set of data transformations completes without error; and
executing the updated set of data transformations on the input dataset to convert the input dataset into the validated format.

16. The non-transitory computer-readable medium of claim 15, the operations further comprising:
receiving the input data set in a non-validated format that cannot be parsed by the data visualization application.

17. The non-transitory computer-readable medium of claim 15, the operations further comprising:
generating database-executable code defining the updated set of data transformations based on browser-executable code defining the data transformations, the browser-executable code having been used to execute the updated set of data transformations to the sample data set.

18. The non-transitory computer-readable medium of claim 15, wherein the data visualization application is configured to parse the input data in the validated format to cause a visualization of the input data, the visualization including at least one of: a point plot, a network graph, or a histogram.

19. The non-transitory computer-readable medium of claim 15, the operations further comprising:
receiving an additional input dataset in the non-validated format; and
in response to receiving the additional input dataset, automatically executing the updated set of data transformations to convert the additional input dataset into the validated format.

20. The non-transitory computer-readable medium of claim 19, the operations further comprising:
receiving a request to filter a portion of the input dataset that is in the validated format;
in response to receiving the request, generating a first filtered dataset extracted from the input dataset that is in the validated format;
receiving a refresh request for the first filtered dataset; and
in response to receiving the refresh request, generating a second filtered dataset that includes validated data from the additional input dataset in the validated format.

* * * * *